United States Patent
Girulat, Jr.

(10) Patent No.: US 9,697,263 B1
(45) Date of Patent: Jul. 4, 2017

(54) CONSUMER DATA REQUEST FULFILLMENT SYSTEM

(71) Applicant: Experian Information Solutions, Inc., Costa Mesa, CA (US)

(72) Inventor: Rollin M. Girulat, Jr., Lake Forest, CA (US)

(73) Assignee: EXPERIAN INFORMATION SOLUTIONS, INC., Costa Mesa, CA (US)

( * ) Notice: Subject to any disclaimer, the term of this patent is extended or adjusted under 35 U.S.C. 154(b) by 323 days.

(21) Appl. No.: 13/784,063

(22) Filed: Mar. 4, 2013

(51) Int. Cl.
*G06F 17/30* (2006.01)

(52) U.S. Cl.
CPC .............................. *G06F 17/30554* (2013.01)

(58) Field of Classification Search
None
See application file for complete search history.

(56) References Cited

U.S. PATENT DOCUMENTS

| | | |
|---|---|---|
| 3,316,395 A | 4/1967 | Lavin et al. |
| 4,163,290 A | 7/1979 | Sutherlin et al. |
| 4,346,442 A | 8/1982 | Musmanno |
| 4,491,725 A | 1/1985 | Pritchard |
| 4,774,664 A | 9/1988 | Campbell et al. |
| 4,812,628 A | 3/1989 | Boston et al. |
| 4,827,508 A | 5/1989 | Shear |
| 4,868,570 A | 9/1989 | Davis |
| 4,872,113 A | 10/1989 | Dinerstein |
| 4,891,503 A | 1/1990 | Jewell |

(Continued)

FOREIGN PATENT DOCUMENTS

| | | |
|---|---|---|
| CN | 101452555 | 6/2009 |
| CN | 102096886 | 6/2011 |

(Continued)

OTHER PUBLICATIONS

U.S. Appl. No. 12/705,489, filed Feb. 12, 2010, Bargoli et al.

(Continued)

*Primary Examiner* — Mark D Featherstone
*Assistant Examiner* — Diedra McQuitery
(74) *Attorney, Agent, or Firm* — Knobbe, Martens, Olson & Bear LLP

(57) ABSTRACT

A consumer data request fulfillment system enables a client to easily and speedily obtain consumer contact data that the client does not already possess. The consumer data request fulfillment system provides bulk consumer data to a client upon request. The bulk data may include, for example, encrypted consumer identifiers (IDs), and/or a partial subset of consumer contact information for a particular specified segment of consumers. The client may then request from the system a full set of consumer contact information. For example, the client may send a request for consumer contact information by identifying particular consumers by their consumer IDs. The consumer data request fulfillment system will then provide the full set of consumer contact information to the client. The requests and request fulfillments are advantageously accomplished automatically by the consumer data request fulfillment system, enabling the client to obtain consumer contact information conveniently and rapidly.

16 Claims, 3 Drawing Sheets

(56) References Cited

U.S. PATENT DOCUMENTS

| | | |
|---|---|---|
| 4,935,870 A | 6/1990 | Burk, Jr. et al. |
| 4,947,028 A | 8/1990 | Gorog |
| 4,989,141 A | 1/1991 | Lyons et al. |
| 5,216,612 A | 6/1993 | Cornett et al. |
| 5,239,462 A | 8/1993 | Jones et al. |
| 5,247,575 A | 9/1993 | Sprague et al. |
| 5,274,547 A | 12/1993 | Zoffel et al. |
| 5,301,105 A | 4/1994 | Cummings, Jr. |
| 5,325,509 A | 6/1994 | Lautzenheiser |
| 5,341,429 A | 8/1994 | Stringer et al. |
| 5,500,513 A | 3/1996 | Langhans et al. |
| 5,528,701 A | 6/1996 | Aref |
| 5,555,409 A | 9/1996 | Leenstra, Sr. et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,644,778 A | 7/1997 | Burks et al. |
| 5,649,114 A | 7/1997 | Deaton et al. |
| 5,655,129 A | 8/1997 | Ito |
| 5,659,725 A | 8/1997 | Levy et al. |
| 5,659,731 A | 8/1997 | Gustafson |
| 5,666,528 A | 9/1997 | Thai |
| 5,692,107 A | 11/1997 | Simoudis et al. |
| 5,696,907 A | 12/1997 | Tom |
| 5,699,527 A | 12/1997 | Davidson |
| 5,704,044 A | 12/1997 | Tarter et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,764,923 A | 6/1998 | Tallman et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,819,291 A | 10/1998 | Haimowitz et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikeland |
| 5,832,068 A | 11/1998 | Smith |
| 5,832,447 A | 11/1998 | Rieker et al. |
| 5,835,915 A | 11/1998 | Carr et al. |
| 5,842,211 A | 11/1998 | Horadan et al. |
| 5,844,218 A | 12/1998 | Kawan et al. |
| 5,870,721 A | 2/1999 | Norris |
| 5,878,403 A | 3/1999 | DeFrancesco et al. |
| 5,881,131 A | 3/1999 | Farris et al. |
| 5,884,287 A | 3/1999 | Edesess |
| 5,893,090 A | 4/1999 | Friedman et al. |
| 5,903,830 A | 5/1999 | Joao et al. |
| 5,903,881 A | 5/1999 | Schrader et al. |
| 5,905,985 A | 5/1999 | Malloy et al. |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,963,932 A | 10/1999 | Jakobsson et al. |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,014,632 A | 1/2000 | Gamble et al. |
| 6,014,688 A | 1/2000 | Venkatraman et al. |
| 6,018,723 A | 1/2000 | Siegel et al. |
| 6,021,397 A | 2/2000 | Jones et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,067,522 A | 5/2000 | Warady et al. |
| 6,070,147 A | 5/2000 | Harms et al. |
| 6,070,241 A | 5/2000 | Edwards et al. |
| 6,073,104 A | 6/2000 | Field |
| 6,073,106 A | 6/2000 | Rozen et al. |
| 6,073,140 A | 6/2000 | Morgan et al. |
| 6,085,242 A | 7/2000 | Chandra |
| 6,088,686 A | 7/2000 | Walker et al. |
| 6,098,052 A | 8/2000 | Kosiba et al. |
| 6,108,641 A | 8/2000 | Kenna et al. |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,129,273 A | 10/2000 | Shah |
| 6,144,948 A | 11/2000 | Walker et al. |
| 6,144,957 A | 11/2000 | Cohen et al. |
| 6,151,601 A | 11/2000 | Papierniak et al. |
| 6,154,729 A | 11/2000 | Cannon et al. |
| 6,157,707 A | 12/2000 | Baulier et al. |
| 6,157,927 A | 12/2000 | Schaefer et al. |
| 6,161,139 A | 12/2000 | Win et al. |
| 6,163,770 A | 12/2000 | Gamble et al. |
| 6,171,112 B1 | 1/2001 | Clark et al. |
| 6,178,442 B1 | 1/2001 | Yamazaki |
| 6,182,229 B1 | 1/2001 | Nielsen |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,223,171 B1 | 4/2001 | Chaudhuri et al. |
| 6,253,202 B1 | 6/2001 | Gilmour |
| 6,253,203 B1 | 6/2001 | O'Flaherty et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,263,447 B1 | 7/2001 | French et al. |
| 6,269,369 B1 | 7/2001 | Robertson |
| 6,275,824 B1 * | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin, Jr. et al. |
| 6,304,869 B1 | 10/2001 | Moore et al. |
| 6,311,169 B2 | 10/2001 | Duhon |
| 6,321,205 B1 | 11/2001 | Eder |
| 6,321,339 B1 | 11/2001 | French et al. |
| 6,339,769 B1 | 1/2002 | Cochrane et al. |
| 6,343,279 B1 | 1/2002 | Bissonette et al. |
| 6,366,903 B1 | 4/2002 | Agrawal et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,197 B1 | 5/2002 | Gindlesperger |
| 6,397,224 B1 | 5/2002 | Zubeldia et al. |
| 6,405,173 B1 | 6/2002 | Honarvar |
| 6,405,181 B2 | 6/2002 | Lent et al. |
| 6,424,878 B1 | 7/2002 | Barker et al. |
| 6,446,200 B1 | 9/2002 | Ball et al. |
| 6,448,980 B1 | 9/2002 | Kumar et al. |
| 6,453,297 B1 | 9/2002 | Burks et al. |
| 6,453,353 B1 | 9/2002 | Win et al. |
| 6,456,983 B1 | 9/2002 | Keyes et al. |
| 6,457,012 B1 | 9/2002 | Jatkowski |

(56) References Cited

U.S. PATENT DOCUMENTS

| | | |
|---|---|---|
| 6,463,533 B1 | 10/2002 | Calamera et al. |
| 6,496,819 B1 | 12/2002 | Bello et al. |
| 6,496,827 B2 | 12/2002 | Kozam et al. |
| 6,496,931 B1 | 12/2002 | Rajchel et al. |
| 6,496,936 B1 | 12/2002 | French et al. |
| 6,505,168 B1 | 1/2003 | Rothman et al. |
| 6,513,018 B1 | 1/2003 | Culhane |
| 6,523,021 B1 | 2/2003 | Monberg et al. |
| 6,523,022 B1 | 2/2003 | Hobbs |
| 6,523,041 B1 | 2/2003 | Morgan et al. |
| 6,532,450 B1 | 3/2003 | Brown et al. |
| 6,543,683 B2 | 4/2003 | Hoffman |
| 6,564,210 B1 | 5/2003 | Korda et al. |
| 6,574,623 B1 | 6/2003 | Leung et al. |
| 6,574,736 B1 | 6/2003 | Andrews |
| 6,581,059 B1 | 6/2003 | Barrett et al. |
| 6,587,841 B1 | 7/2003 | DeFrancesco et al. |
| 6,598,030 B1 | 7/2003 | Siegel et al. |
| 6,601,173 B1 | 7/2003 | Mohler |
| 6,601,234 B1 | 7/2003 | Bowman-Amuah |
| 6,611,816 B2 | 8/2003 | Lebda et al. |
| 6,629,245 B1 | 9/2003 | Stone et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,684,093 B2 | 1/2004 | Kuth |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,738,748 B2 | 5/2004 | Wetzer |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,804,346 B1 | 10/2004 | Mewhinney |
| 6,804,701 B2 | 10/2004 | Muret et al. |
| 6,805,287 B2 | 10/2004 | Bishop et al. |
| 6,807,533 B1 | 10/2004 | Land et al. |
| 6,816,850 B2 | 11/2004 | Culliss |
| 6,826,535 B2 | 11/2004 | Wood et al. |
| 6,845,448 B1 | 1/2005 | Chaganti et al. |
| 6,847,942 B1 | 1/2005 | Land et al. |
| 6,850,895 B2 | 2/2005 | Brodersen et al. |
| 6,857,073 B2 | 2/2005 | French et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,989 B2 | 9/2005 | Gullotta et al. |
| 6,950,807 B2 | 9/2005 | Brock |
| 6,950,858 B2 | 9/2005 | Ogami |
| 6,954,757 B2 | 10/2005 | Zargham et al. |
| 6,968,319 B1 | 11/2005 | Remington et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,988,085 B2 | 1/2006 | Hedy |
| 6,999,941 B1 | 2/2006 | Agarwal |
| 7,003,491 B2 | 2/2006 | Starkman |
| 7,003,504 B1 | 2/2006 | Angus et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,039,607 B2 | 5/2006 | Watarai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,058,817 B1 | 6/2006 | Ellmore |
| 7,062,475 B1 | 6/2006 | Szabo et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,076,475 B2 | 7/2006 | Honarvar |
| 7,082,435 B1 | 7/2006 | Guzman et al. |
| 7,092,898 B1 | 8/2006 | Mattick et al. |
| 7,107,241 B1 | 9/2006 | Pinto |
| 7,117,172 B1 | 10/2006 | Black |
| 7,124,144 B2 | 10/2006 | Christianson et al. |
| 7,133,840 B1 | 11/2006 | Kenna et al. |
| 7,133,935 B2 | 11/2006 | Hedy |
| 7,155,739 B2 | 12/2006 | Bari et al. |
| 7,167,907 B2 | 1/2007 | Shaffer et al. |
| 7,171,371 B2 | 1/2007 | Goldstein |
| 7,174,302 B2 | 2/2007 | Patricelli et al. |
| 7,181,427 B1 | 2/2007 | DeFrancesco et al. |
| 7,184,974 B2 | 2/2007 | Shishido |
| 7,185,016 B1 | 2/2007 | Rasmussen |
| 7,188,169 B2 | 3/2007 | Buus et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,200,602 B2 | 4/2007 | Jonas |
| 7,206,768 B1 | 4/2007 | deGroeve et al. |
| 7,212,995 B2 | 5/2007 | Schulkins |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,236,950 B2 | 6/2007 | Savage et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,246,068 B2 | 7/2007 | Thomas, Jr. |
| 7,249,048 B1 | 7/2007 | O'Flaherty |
| 7,249,076 B1 | 7/2007 | Pendleton et al. |
| 7,249,113 B1 | 7/2007 | Continelli et al. |
| 7,251,625 B2 | 7/2007 | Anglum |
| 7,263,497 B1 | 8/2007 | Wiser et al. |
| 7,272,591 B1 | 9/2007 | Ghazal et al. |
| 7,277,869 B2 | 10/2007 | Starkman |
| 7,277,900 B1 | 10/2007 | Ganesh et al. |
| 7,281,652 B2 | 10/2007 | Foss |
| 7,289,971 B1 | 10/2007 | O'Neil et al. |
| 7,295,988 B1 | 11/2007 | Reeves |
| 7,298,872 B2 | 11/2007 | Glisson |
| 7,302,420 B2 | 11/2007 | Aggarwal et al. |
| 7,305,359 B2 | 12/2007 | Bonnell |
| 7,310,617 B1 | 12/2007 | Cunningham |
| 7,313,538 B2 | 12/2007 | Wilmes et al. |
| 7,315,837 B2 | 1/2008 | Sloan et al. |
| 7,328,233 B2 | 2/2008 | Salim et al. |
| 7,328,276 B2 | 2/2008 | Alisuag |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,340,679 B2 | 3/2008 | Botscheck et al. |
| 7,343,295 B2 | 3/2008 | Pomerance |
| 7,346,576 B2 | 3/2008 | Lent et al. |
| 7,346,703 B2 | 3/2008 | Cope |
| 7,356,516 B2 | 4/2008 | Richey et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,988 B2 | 6/2008 | Slonecker, Jr. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |

(56) References Cited

U.S. PATENT DOCUMENTS

| | | |
|---|---|---|
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,433,864 B2 | 10/2008 | Malik |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,479,949 B2 | 1/2009 | Jobs et al. |
| 7,483,842 B1 | 1/2009 | Fung et al. |
| 7,490,356 B2 | 2/2009 | Lieblich et al. |
| 7,505,938 B2 | 3/2009 | Lang et al. |
| 7,505,939 B2 | 3/2009 | Lent et al. |
| 7,527,967 B2 | 5/2009 | Chao et al. |
| 7,529,698 B2 | 5/2009 | Joao |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,086 B1 | 6/2009 | Rajasekar et al. |
| 7,552,089 B2 | 6/2009 | Bruer et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,577,934 B2 | 8/2009 | Anonsen et al. |
| 7,584,126 B1 | 9/2009 | White |
| 7,584,127 B2 | 9/2009 | Byrne et al. |
| 7,584,146 B1 | 9/2009 | Duhon |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1 | 10/2009 | Kornegay |
| 7,613,600 B2 | 11/2009 | Krane |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,688 B2 | 1/2010 | Bittner |
| 7,668,840 B2 | 2/2010 | Bayliss et al. |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,676,410 B2 | 3/2010 | Petralia |
| 7,676,751 B2 | 3/2010 | Allen et al. |
| 7,685,209 B1 | 3/2010 | Norton et al. |
| 7,689,505 B2 | 3/2010 | Kasower |
| 7,690,032 B1 | 3/2010 | Peirce |
| 7,693,787 B2 | 4/2010 | Provinse |
| 7,698,163 B2 | 4/2010 | Reed et al. |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,059 B2 | 4/2010 | Reed et al. |
| 7,707,102 B2 | 4/2010 | Rothstein |
| 7,707,271 B2 | 4/2010 | Rudkin et al. |
| 7,711,635 B2 | 5/2010 | Steele et al. |
| 7,711,636 B2 | 5/2010 | Robida et al. |
| 7,720,750 B2 | 5/2010 | Brody |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,040 B2 | 8/2010 | Haskell et al. |
| 7,792,715 B1 | 9/2010 | Kasower |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,805,345 B2 | 9/2010 | Abrahams et al. |
| 7,810,036 B2 | 10/2010 | Bales et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,844,604 B2 | 11/2010 | Baio et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,386 B2 | 12/2010 | Hazlehurst et al. |
| 7,860,786 B2 | 12/2010 | Blackburn et al. |
| 7,870,078 B2 | 1/2011 | Clark et al. |
| 7,877,304 B1 | 1/2011 | Coulter |
| 7,899,750 B1 | 3/2011 | Klieman et al. |
| 7,900,052 B2 | 3/2011 | Jonas |
| 7,904,306 B2 | 3/2011 | Johnson et al. |
| 7,904,367 B2 | 3/2011 | Chung et al. |
| 7,908,242 B1 | 3/2011 | Achanta |
| 7,912,865 B2 | 3/2011 | Akerman et al. |
| 7,930,195 B2 | 4/2011 | Heyns et al. |
| 7,930,242 B2 | 4/2011 | Morris et al. |
| 7,930,252 B2 | 4/2011 | Bender et al. |
| 7,941,363 B2 | 5/2011 | Tanaka et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,983,976 B2 | 7/2011 | Nafeh et al. |
| 7,983,979 B2 | 7/2011 | Holland, IV |
| 7,991,689 B1 | 8/2011 | Brunzell et al. |
| 7,991,901 B2 | 8/2011 | Tarquini et al. |
| 7,996,912 B2 | 8/2011 | Spalink et al. |
| 8,001,034 B2 | 8/2011 | Chung et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,015,107 B2 | 9/2011 | Kornegay et al. |
| 8,024,264 B2 | 9/2011 | Chaudhuri et al. |
| 8,032,932 B2 | 10/2011 | Speyer et al. |
| 8,060,424 B2 | 11/2011 | Kasower |
| 8,065,233 B2 | 11/2011 | Lee et al. |
| 8,065,234 B2 | 11/2011 | Liao et al. |

(56) References Cited

U.S. PATENT DOCUMENTS

| | | | |
|---|---|---|---|
| 8,065,264 | B1 | 11/2011 | Achanta |
| 8,078,524 | B2 | 12/2011 | Crawford et al. |
| 8,078,527 | B2 | 12/2011 | Cerise et al. |
| 8,078,528 | B1 | 12/2011 | Vicente et al. |
| 8,082,202 | B2 | 12/2011 | Weiss |
| 8,086,523 | B1 | 12/2011 | Palmer |
| 8,095,443 | B2 | 1/2012 | DeBie |
| 8,095,458 | B2 | 1/2012 | Peterson et al. |
| 8,099,309 | B1 | 1/2012 | Bober |
| 8,099,341 | B2 | 1/2012 | Varghese |
| 8,104,679 | B2 | 1/2012 | Brown |
| 8,127,982 | B1 | 3/2012 | Casey et al. |
| 8,127,986 | B1 | 3/2012 | Taylor et al. |
| 8,131,685 | B1 | 3/2012 | Gedalius et al. |
| 8,131,777 | B2 | 3/2012 | McCullough |
| 8,135,642 | B1 | 3/2012 | Krause |
| 8,160,960 | B1 | 4/2012 | Fei et al. |
| 8,161,104 | B2 | 4/2012 | Tomkow |
| 8,195,549 | B2 | 6/2012 | Kasower |
| 8,201,257 | B1 | 6/2012 | Andres et al. |
| 8,204,774 | B2 | 6/2012 | Chwast et al. |
| 8,204,812 | B2 | 6/2012 | Stewart et al. |
| 8,214,238 | B1 | 7/2012 | Fairfield et al. |
| 8,224,723 | B2 | 7/2012 | Bosch et al. |
| 8,225,395 | B2 | 7/2012 | Atwood et al. |
| 8,234,498 | B2 | 7/2012 | Britti et al. |
| 8,271,378 | B2 | 9/2012 | Chaudhuri et al. |
| 8,280,805 | B1 | 10/2012 | Abrahams et al. |
| 8,285,656 | B1 | 10/2012 | Chang et al. |
| 8,290,840 | B2 | 10/2012 | Kasower |
| 8,296,229 | B1 | 10/2012 | Yellin et al. |
| 8,312,033 | B1 * | 11/2012 | McMillan ............... G06Q 10/10 707/758 |
| 8,321,334 | B1 | 11/2012 | Kornegay et al. |
| 8,321,339 | B2 | 11/2012 | Imrey et al. |
| 8,321,952 | B2 | 11/2012 | Spalink et al. |
| 8,326,672 | B2 | 12/2012 | Haggerty et al. |
| 8,327,429 | B2 | 12/2012 | Speyer et al. |
| 8,355,967 | B2 | 1/2013 | Debie et al. |
| 8,364,518 | B1 | 1/2013 | Blake et al. |
| 8,364,588 | B2 | 1/2013 | Celka et al. |
| 8,380,618 | B1 | 2/2013 | Kazenas et al. |
| 8,386,377 | B1 | 2/2013 | Xiong et al. |
| 8,392,334 | B2 | 3/2013 | Hirtenstein et al. |
| 8,412,593 | B1 | 4/2013 | Song et al. |
| 8,418,254 | B2 | 4/2013 | Britti et al. |
| 8,433,648 | B2 | 4/2013 | Keithley et al. |
| 8,442,886 | B1 | 5/2013 | Haggerty et al. |
| 8,458,062 | B2 | 6/2013 | Dutt et al. |
| 8,458,074 | B2 | 6/2013 | Showalter |
| 8,463,919 | B2 | 6/2013 | Tarquini et al. |
| 8,464,939 | B1 | 6/2013 | Taylor et al. |
| 8,468,198 | B2 | 6/2013 | Tomkow |
| 8,478,674 | B1 | 7/2013 | Kapczynski et al. |
| 8,515,828 | B1 | 8/2013 | Wolf et al. |
| 8,515,844 | B2 | 8/2013 | Kasower |
| 8,515,862 | B2 | 8/2013 | Zhang et al. |
| 8,533,118 | B2 | 9/2013 | Weller et al. |
| 8,560,434 | B2 | 10/2013 | Morris et al. |
| 8,560,436 | B2 | 10/2013 | Ingram et al. |
| 8,566,141 | B1 * | 10/2013 | Nagdev .................. G06Q 30/02 705/7.29 |
| 8,571,971 | B1 | 10/2013 | Brown et al. |
| 8,572,083 | B1 | 10/2013 | Snell et al. |
| 8,583,593 | B1 | 11/2013 | Achanta |
| 8,595,101 | B1 | 11/2013 | Daukas et al. |
| 8,600,886 | B2 | 12/2013 | Ramavarjula et al. |
| 8,606,666 | B1 | 12/2013 | Courbage et al. |
| 8,606,694 | B1 | 12/2013 | Campbell et al. |
| 8,621,562 | B2 | 12/2013 | Antell et al. |
| 8,631,242 | B2 | 1/2014 | Britti et al. |
| 8,639,616 | B1 | 1/2014 | Rolenaitis et al. |
| 8,639,920 | B2 | 1/2014 | Stack et al. |
| 8,646,101 | B2 | 2/2014 | Millwee |
| 8,650,407 | B2 | 2/2014 | Britti et al. |
| 8,671,107 | B2 | 3/2014 | Scully et al. |
| 8,694,420 | B1 | 4/2014 | Oliai |
| 8,705,718 | B2 | 4/2014 | Baniak et al. |
| 8,719,159 | B2 | 5/2014 | Keithley |
| 8,725,613 | B1 | 5/2014 | Celka et al. |
| 8,738,515 | B2 | 5/2014 | Chaudhuri et al. |
| 8,738,516 | B1 | 5/2014 | Dean et al. |
| 8,744,956 | B1 | 6/2014 | DiChiara et al. |
| 8,768,914 | B2 | 7/2014 | Scriffignano et al. |
| 8,775,299 | B2 | 7/2014 | Achanta et al. |
| 8,781,953 | B2 | 7/2014 | Kasower |
| 8,782,217 | B1 | 7/2014 | Arone et al. |
| 8,806,218 | B2 | 8/2014 | Hatakeda |
| 8,818,888 | B1 | 8/2014 | Kapczynski et al. |
| 8,856,894 | B1 | 10/2014 | Dean et al. |
| 8,930,251 | B2 | 1/2015 | DeBie |
| 8,930,262 | B1 | 1/2015 | Searson et al. |
| 8,931,058 | B2 | 1/2015 | DiChiara et al. |
| 8,949,981 | B1 | 2/2015 | Trollope et al. |
| 8,954,459 | B1 | 2/2015 | McMillan et al. |
| 8,966,649 | B2 | 2/2015 | Stack et al. |
| 8,972,400 | B1 | 3/2015 | Kapczynski et al. |
| 9,043,930 | B2 | 5/2015 | Britti et al. |
| 9,058,627 | B1 | 6/2015 | Wasser et al. |
| 9,147,042 | B1 | 9/2015 | Haller et al. |
| 9,152,727 | B1 | 10/2015 | Balducci et al. |
| 9,183,363 | B1 | 11/2015 | Millwee |
| 9,251,541 | B2 | 2/2016 | Celka et al. |
| 9,256,904 | B1 | 2/2016 | Haller et al. |
| 9,489,694 | B2 | 11/2016 | Haller et al. |
| 2001/0000536 | A1 | 4/2001 | Tarin |
| 2001/0011245 | A1 | 8/2001 | Duhon |
| 2001/0011247 | A1 | 8/2001 | O'Flaherty et al. |
| 2001/0014868 | A1 | 8/2001 | Herz et al. |
| 2001/0029470 | A1 | 10/2001 | Schultz et al. |
| 2001/0029482 | A1 | 10/2001 | Tealdi et al. |
| 2001/0034618 | A1 | 10/2001 | Kessler et al. |
| 2001/0037332 | A1 | 11/2001 | Miller et al. |
| 2001/0039523 | A1 | 11/2001 | Iwamoto |
| 2001/0039532 | A1 | 11/2001 | Coleman, Jr. et al. |
| 2001/0042785 | A1 | 11/2001 | Walker et al. |
| 2001/0044729 | A1 | 11/2001 | Pomerance |
| 2001/0044756 | A1 | 11/2001 | Watkins et al. |
| 2001/0049274 | A1 | 12/2001 | Degraeve |
| 2001/0049620 | A1 | 12/2001 | Blasko |
| 2002/0004736 | A1 | 1/2002 | Roundtree et al. |
| 2002/0004774 | A1 | 1/2002 | Defarlo |
| 2002/0010594 | A1 | 1/2002 | Levine |
| 2002/0010664 | A1 | 1/2002 | Rabideau et al. |
| 2002/0010701 | A1 | 1/2002 | Kosciuszko et al. |
| 2002/0013827 | A1 | 1/2002 | Edstrom et al. |
| 2002/0026507 | A1 | 2/2002 | Sears et al. |
| 2002/0026519 | A1 | 2/2002 | Itabashi et al. |
| 2002/0033846 | A1 | 3/2002 | Balasubramanian et al. |
| 2002/0042763 | A1 | 4/2002 | Pillay et al. |
| 2002/0049701 | A1 | 4/2002 | Nabe et al. |
| 2002/0049738 | A1 | 4/2002 | Epstein |
| 2002/0052841 | A1 | 5/2002 | Guthrie et al. |
| 2002/0052884 | A1 | 5/2002 | Farber et al. |
| 2002/0055869 | A1 | 5/2002 | Hegg |
| 2002/0069122 | A1 | 6/2002 | Yun et al. |
| 2002/0072927 | A1 | 6/2002 | Phelan et al. |
| 2002/0077964 | A1 | 6/2002 | Brody et al. |
| 2002/0091650 | A1 | 7/2002 | Ellis |
| 2002/0091706 | A1 | 7/2002 | Anderson et al. |
| 2002/0099628 | A1 | 7/2002 | Takaoka et al. |
| 2002/0099635 | A1 | 7/2002 | Guiragosian |
| 2002/0099641 | A1 | 7/2002 | Mills et al. |
| 2002/0099824 | A1 | 7/2002 | Bender et al. |
| 2002/0099936 | A1 | 7/2002 | Kou et al. |
| 2002/0103809 | A1 | 8/2002 | Starzl et al. |
| 2002/0103933 | A1 | 8/2002 | Garon et al. |
| 2002/0107849 | A1 | 8/2002 | Hickey et al. |
| 2002/0111816 | A1 | 8/2002 | Lortscher et al. |
| 2002/0111910 | A1 | 8/2002 | Walsh |
| 2002/0119824 | A1 | 8/2002 | Allen |
| 2002/0120757 | A1 | 8/2002 | Sutherland et al. |
| 2002/0128962 | A1 | 9/2002 | Kasower |
| 2002/0131565 | A1 | 9/2002 | Scheuring et al. |

(56) References Cited

U.S. PATENT DOCUMENTS

| | | |
|---|---|---|
| 2002/0133365 A1 | 9/2002 | Grey et al. |
| 2002/0133504 A1 | 9/2002 | Vlahos et al. |
| 2002/0138297 A1 | 9/2002 | Lee |
| 2002/0138470 A1 | 9/2002 | Zhou |
| 2002/0143943 A1 | 10/2002 | Lee et al. |
| 2002/0147617 A1 | 10/2002 | Schoenbaum et al. |
| 2002/0147669 A1 | 10/2002 | Taylor et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0188544 A1 | 12/2002 | Wizon et al. |
| 2002/0194103 A1 | 12/2002 | Nabe |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0014336 A1 | 1/2003 | Dao et al. |
| 2003/0018549 A1 | 1/2003 | Fei et al. |
| 2003/0018578 A1 | 1/2003 | Schultz |
| 2003/0023531 A1 | 1/2003 | Fergusson |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0041050 A1 | 2/2003 | Smith et al. |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0050882 A1 | 3/2003 | Degen et al. |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham et al. |
| 2003/0105742 A1 | 6/2003 | Boreham et al. |
| 2003/0110111 A1 | 6/2003 | Nalebuff et al. |
| 2003/0149659 A1 | 8/2003 | Danaher et al. |
| 2003/0153299 A1 | 8/2003 | Perfit et al. |
| 2003/0158776 A1 | 8/2003 | Landesmann |
| 2003/0163416 A1 | 8/2003 | Kitajima |
| 2003/0163483 A1 | 8/2003 | Zingher et al. |
| 2003/0163513 A1 | 8/2003 | Schaeck et al. |
| 2003/0171942 A1 | 9/2003 | Gaito |
| 2003/0191731 A1 | 10/2003 | Stewart et al. |
| 2003/0200151 A1 | 10/2003 | Ellenson et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0220858 A1 | 11/2003 | Lam et al. |
| 2003/0229507 A1 | 12/2003 | Perge |
| 2003/0229892 A1 | 12/2003 | Sardera |
| 2003/0233259 A1 | 12/2003 | Mistretta et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0019799 A1 | 1/2004 | Vering et al. |
| 2004/0023637 A1 | 2/2004 | Johnson et al. |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0039688 A1 | 2/2004 | Sulkowski et al. |
| 2004/0044563 A1 | 3/2004 | Stein |
| 2004/0044673 A1 | 3/2004 | Brady et al. |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0083215 A1 | 4/2004 | de Jong |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111305 A1 | 6/2004 | Gavan et al. |
| 2004/0111359 A1 | 6/2004 | Hudock |
| 2004/0117235 A1 | 6/2004 | Shacham |
| 2004/0117302 A1 | 6/2004 | Weichert et al. |
| 2004/0117358 A1 | 6/2004 | Von Kaenel et al. |
| 2004/0122696 A1 | 6/2004 | Beringer |
| 2004/0128150 A1 | 7/2004 | Lundegren |
| 2004/0128156 A1 | 7/2004 | Beringer et al. |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153437 A1 | 8/2004 | Buchan |
| 2004/0153448 A1 | 8/2004 | Cheng et al. |
| 2004/0153521 A1 | 8/2004 | Kogo |
| 2004/0158523 A1 | 8/2004 | Dort |
| 2004/0159700 A1 | 8/2004 | Khan et al. |
| 2004/0167793 A1 | 8/2004 | Masuoka et al. |
| 2004/0176995 A1 | 9/2004 | Fusz |
| 2004/0177030 A1 | 9/2004 | Shoham |
| 2004/0177114 A1 | 9/2004 | Friedman et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0204948 A1 | 10/2004 | Singletary et al. |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225545 A1 | 11/2004 | Turner et al. |
| 2004/0225594 A1 | 11/2004 | Nolan, III et al. |
| 2004/0225596 A1 | 11/2004 | Kemper et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243588 A1 | 12/2004 | Tanner et al. |
| 2004/0254935 A1 | 12/2004 | Chagoly et al. |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0027633 A1 | 2/2005 | Fortuna et al. |

(56) References Cited

U.S. PATENT DOCUMENTS

| | | |
|---|---|---|
| 2005/0027983 A1 | 2/2005 | Klawon |
| 2005/0027995 A1 | 2/2005 | Menschik et al. |
| 2005/0038737 A1 | 2/2005 | Norris |
| 2005/0049991 A1 | 3/2005 | Aggarwal |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0060332 A1 | 3/2005 | Bernstein et al. |
| 2005/0065874 A1 | 3/2005 | Lefner et al. |
| 2005/0071328 A1 | 3/2005 | Lawrence |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger et al. |
| 2005/0114344 A1 | 5/2005 | Wesinger et al. |
| 2005/0114345 A1 | 5/2005 | Wesinger et al. |
| 2005/0125291 A1 | 6/2005 | Demkiw Grayson et al. |
| 2005/0125397 A1 | 6/2005 | Gross et al. |
| 2005/0137899 A1 | 6/2005 | Davies et al. |
| 2005/0137912 A1 | 6/2005 | Rao et al. |
| 2005/0144452 A1 | 6/2005 | Lynch et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0187948 A1 | 8/2005 | Monitzer et al. |
| 2005/0192008 A1 | 9/2005 | Desai et al. |
| 2005/0197953 A1 | 9/2005 | Broadbent et al. |
| 2005/0208461 A1 | 9/2005 | Krebs et al. |
| 2005/0209880 A1 | 9/2005 | Drelicharz et al. |
| 2005/0209922 A1 | 9/2005 | Hofmeister |
| 2005/0226224 A1 | 10/2005 | Lee et al. |
| 2005/0228748 A1 | 10/2005 | Togher et al. |
| 2005/0246338 A1 | 11/2005 | Bird |
| 2005/0251474 A1 | 11/2005 | Shinn et al. |
| 2005/0257250 A1 | 11/2005 | Mitchell et al. |
| 2005/0262158 A1 | 11/2005 | Sauermann |
| 2005/0267840 A1 | 12/2005 | Holm-Blagg et al. |
| 2005/0273431 A1 | 12/2005 | Abel et al. |
| 2005/0273849 A1 | 12/2005 | Araujo et al. |
| 2005/0279827 A1 | 12/2005 | Mascavage et al. |
| 2005/0288998 A1 | 12/2005 | Verma et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041670 A1 | 2/2006 | Musseleck et al. |
| 2006/0059086 A1 | 3/2006 | Mulhern |
| 2006/0069635 A1 | 3/2006 | Ram et al. |
| 2006/0074991 A1 | 4/2006 | Lussier et al. |
| 2006/0079211 A1 | 4/2006 | Degraeve |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0085361 A1 | 4/2006 | Hoerle et al. |
| 2006/0085454 A1 | 4/2006 | Blegen et al. |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0129419 A1 | 6/2006 | Flaxer et al. |
| 2006/0136330 A1 | 6/2006 | DeRoy et al. |
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155639 A1 | 7/2006 | Lynch et al. |
| 2006/0155780 A1 | 7/2006 | Sakairi et al. |
| 2006/0161554 A1 | 7/2006 | Lucovsky et al. |
| 2006/0173772 A1 | 8/2006 | Hayes et al. |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0179050 A1 | 8/2006 | Giang et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0235935 A1 | 10/2006 | Ng |
| 2006/0242046 A1 | 10/2006 | Haggerty et al. |
| 2006/0242047 A1 | 10/2006 | Haggerty et al. |
| 2006/0271457 A1 | 11/2006 | Romain et al. |
| 2006/0271472 A1 | 11/2006 | Cagan |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293979 A1 | 12/2006 | Cash et al. |
| 2006/0294199 A1 | 12/2006 | Bertholf |
| 2007/0011020 A1 | 1/2007 | Martin |
| 2007/0011083 A1 | 1/2007 | Bird et al. |
| 2007/0016500 A1 | 1/2007 | Chatterji et al. |
| 2007/0016520 A1 | 1/2007 | Gang et al. |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0047714 A1 | 3/2007 | Baniak et al. |
| 2007/0067207 A1 | 3/2007 | Haggerty et al. |
| 2007/0067297 A1 | 3/2007 | Kublickis |
| 2007/0067437 A1 | 3/2007 | Sindambiwe |
| 2007/0083460 A1 | 4/2007 | Bachenheimer |
| 2007/0083463 A1 | 4/2007 | Kraft |
| 2007/0094137 A1 | 4/2007 | Phillips et al. |
| 2007/0094230 A1 | 4/2007 | Subramaniam et al. |
| 2007/0094241 A1 | 4/2007 | Blackwell et al. |
| 2007/0094264 A1 | 4/2007 | Nair |
| 2007/0100719 A1 | 5/2007 | Chwast et al. |
| 2007/0106582 A1 | 5/2007 | Baker et al. |
| 2007/0112668 A1 | 5/2007 | Celano et al. |
| 2007/0118393 A1 | 5/2007 | Rosen et al. |
| 2007/0118410 A1 | 5/2007 | Nadai |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0156692 A1 | 7/2007 | Rosewarne |
| 2007/0162414 A1 | 7/2007 | Horowitz et al. |
| 2007/0185797 A1 | 8/2007 | Robinson |
| 2007/0192121 A1 | 8/2007 | Routson et al. |
| 2007/0192122 A1 | 8/2007 | Routson et al. |
| 2007/0198336 A1 | 8/2007 | Thompson |

(56) References Cited

U.S. PATENT DOCUMENTS

| | | |
|---|---|---|
| 2007/0198407 A1 | 8/2007 | Winter |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226047 A1 | 9/2007 | Ward |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0282736 A1 | 12/2007 | Conlin et al. |
| 2007/0284433 A1 | 12/2007 | Domenica et al. |
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2007/0299759 A1 | 12/2007 | Kelly |
| 2008/0010203 A1 | 1/2008 | Grant |
| 2008/0010206 A1 | 1/2008 | Coleman |
| 2008/0015979 A1 | 1/2008 | Bentley |
| 2008/0021804 A1 | 1/2008 | Deckoff |
| 2008/0027858 A1 | 1/2008 | Benson |
| 2008/0033742 A1 | 2/2008 | Bernasconi |
| 2008/0033956 A1 | 2/2008 | Saha et al. |
| 2008/0046351 A1 | 2/2008 | Wiener et al. |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0059449 A1 | 3/2008 | Webster et al. |
| 2008/0065569 A1 | 3/2008 | Dutt et al. |
| 2008/0072316 A1 | 3/2008 | Chang et al. |
| 2008/0082536 A1 | 4/2008 | Schwabe et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0120569 A1 | 5/2008 | Mann et al. |
| 2008/0154766 A1 | 6/2008 | Lewis et al. |
| 2008/0162383 A1 | 7/2008 | Kraft |
| 2008/0172324 A1 | 7/2008 | Johnson |
| 2008/0177655 A1 | 7/2008 | Zalik |
| 2008/0183504 A1 | 7/2008 | Highley |
| 2008/0183564 A1 | 7/2008 | Tien et al. |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0205655 A1 | 8/2008 | Wilkins et al. |
| 2008/0208610 A1 | 8/2008 | Thomas et al. |
| 2008/0208726 A1 | 8/2008 | Tsantes et al. |
| 2008/0208735 A1 | 8/2008 | Balet et al. |
| 2008/0208873 A1 | 8/2008 | Boehmer |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0249869 A1 | 10/2008 | Angell et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319832 A1 | 12/2008 | Liebe |
| 2008/0319889 A1 | 12/2008 | Hammad |
| 2008/0320575 A1 | 12/2008 | Gelb et al. |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0048877 A1 | 2/2009 | Binns et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0094237 A1 | 4/2009 | Churi et al. |
| 2009/0094674 A1 | 4/2009 | Schwartz et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0126013 A1 | 5/2009 | Atwood et al. |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0183259 A1 | 7/2009 | Rinek et al. |
| 2009/0210807 A1 | 8/2009 | Xiao et al. |
| 2009/0216640 A1 | 8/2009 | Masi |
| 2009/0222308 A1 | 9/2009 | Zoldi et al. |
| 2009/0222379 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240609 A1 | 9/2009 | Cho et al. |
| 2009/0240624 A1 | 9/2009 | James et al. |
| 2009/0248573 A1 | 10/2009 | Haggerty et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1* | 10/2009 | Herz et al. .................. 726/1 |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0009663 A1 | 1/2010 | Chang |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030578 A1 | 2/2010 | Siddique et al. |
| 2010/0030677 A1 | 2/2010 | Melik-Aslanian et al. |

(56) References Cited

U.S. PATENT DOCUMENTS

| | | |
|---|---|---|
| 2010/0042583 A1* | 2/2010 | Gervais ............... G06Q 40/08 707/757 |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0142698 A1 | 6/2010 | Spottiswoode et al. |
| 2010/0145836 A1 | 6/2010 | Baker et al. |
| 2010/0145840 A1 | 6/2010 | Kasower |
| 2010/0169159 A1 | 7/2010 | Rose et al. |
| 2010/0169264 A1 | 7/2010 | O'Sullivan |
| 2010/0174638 A1 | 7/2010 | Debie et al. |
| 2010/0185546 A1 | 7/2010 | Pollard |
| 2010/0188684 A1 | 7/2010 | Kumara |
| 2010/0205076 A1 | 8/2010 | Parson et al. |
| 2010/0205087 A1 | 8/2010 | Hubler et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0228658 A1 | 9/2010 | Ketelsen et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0293090 A1 | 11/2010 | Domenikos et al. |
| 2010/0299262 A1 | 11/2010 | Handler |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0035315 A1 | 2/2011 | Langley |
| 2011/0040736 A1 | 2/2011 | Kalaboukis |
| 2011/0060654 A1 | 3/2011 | Elliott et al. |
| 2011/0060905 A1 | 3/2011 | Stack et al. |
| 2011/0078073 A1 | 3/2011 | Annappindi |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0264566 A1 | 10/2011 | Brown |
| 2011/0270779 A1 | 11/2011 | Showalter |
| 2011/0270925 A1 | 11/2011 | Mina |
| 2012/0005070 A1 | 1/2012 | McFall et al. |
| 2012/0011056 A1 | 1/2012 | Ward et al. |
| 2012/0023011 A1 | 1/2012 | Hurwitz |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0054592 A1 | 3/2012 | Jaffe et al. |
| 2012/0066084 A1 | 3/2012 | Sneyders |
| 2012/0072464 A1 | 3/2012 | Cohen |
| 2012/0078932 A1 | 3/2012 | Skurtovich, Jr. et al. |
| 2012/0101938 A1 | 4/2012 | Kasower |
| 2012/0101939 A1 | 4/2012 | Kasower |
| 2012/0106801 A1 | 5/2012 | Jackson |
| 2012/0108274 A1 | 5/2012 | Acebo Ruiz et al. |
| 2012/0110467 A1 | 5/2012 | Blake et al. |
| 2012/0123942 A1 | 5/2012 | Song et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173406 A1 | 7/2012 | Fei et al. |
| 2012/0173417 A1 | 7/2012 | Lohman et al. |
| 2012/0179536 A1 | 7/2012 | Kalb et al. |
| 2012/0198556 A1 | 8/2012 | Patel et al. |
| 2012/0215682 A1 | 8/2012 | Lent et al. |
| 2012/0216125 A1 | 8/2012 | Pierce |
| 2012/0226916 A1* | 9/2012 | Hahn ................. G06Q 50/22 713/193 |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0290660 A1 | 11/2012 | Rao et al. |
| 2012/0303514 A1 | 11/2012 | Kasower |
| 2012/0317016 A1 | 12/2012 | Hughes |
| 2012/0324388 A1 | 12/2012 | Rao et al. |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0110565 A1 | 5/2013 | Means et al. |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0173450 A1 | 7/2013 | Celka et al. |
| 2013/0173481 A1 | 7/2013 | Hirtenstein et al. |
| 2013/0185293 A1 | 7/2013 | Boback et al. |
| 2013/0205135 A1 | 8/2013 | Lutz |
| 2013/0211986 A1 | 8/2013 | Debie et al. |
| 2013/0268357 A1* | 10/2013 | Heath ................. 705/14.53 |
| 2013/0279676 A1 | 10/2013 | Baniak et al. |
| 2013/0293363 A1 | 11/2013 | Plymouth |
| 2013/0332338 A1 | 12/2013 | Yan et al. |
| 2013/0332342 A1 | 12/2013 | Kasower |
| 2013/0339249 A1 | 12/2013 | Weller et al. |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0110477 A1 | 4/2014 | Hammad |
| 2014/0136422 A1* | 5/2014 | Jung ................. H04L 67/34 705/74 |
| 2014/0156500 A1 | 6/2014 | Lassen et al. |
| 2014/0156503 A1 | 6/2014 | Lassen et al. |
| 2014/0157375 A1 | 6/2014 | Britti et al. |
| 2014/0164112 A1 | 6/2014 | Kala |
| 2014/0164519 A1 | 6/2014 | Shah |
| 2014/0244353 A1 | 8/2014 | Winters |
| 2014/0258083 A1 | 9/2014 | Achanta et al. |
| 2014/0279329 A1 | 9/2014 | Dancel |
| 2015/0269506 A1 | 9/2015 | Britti et al. |
| 2015/0278944 A1 | 10/2015 | Searson et al. |
| 2015/0310543 A1 | 10/2015 | DeBie |
| 2015/0326580 A1 | 11/2015 | McMillan et al. |

FOREIGN PATENT DOCUMENTS

| | | |
|---|---|---|
| CN | 102663650 | 9/2012 |
| EP | 0 419 889 | 4/1991 |
| EP | 0 458 698 | 11/1991 |
| EP | 0 559 358 | 9/1993 |
| EP | 0 919 942 | 6/1999 |

(56) References Cited

FOREIGN PATENT DOCUMENTS

| | | |
|---|---|---|
| EP | 0 977 128 | 2/2000 |
| EP | 1 028 401 | 8/2000 |
| EP | 0 772 836 | 12/2001 |
| EP | 1 850 278 | 10/2007 |
| EP | 1 988 501 | 11/2008 |
| EP | 2 786 332 | 10/2014 |
| EP | 2 803 032 | 11/2014 |
| GB | 1 322 809 | 7/1973 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| RU | 2 181 216 | 4/2002 |
| WO | WO 94/12943 | 6/1994 |
| WO | WO 95/12857 | 5/1995 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 98/49643 | 11/1998 |
| WO | WO 99/17225 | 4/1999 |
| WO | WO 99/17226 | 4/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 00/55778 | 9/2000 |
| WO | WO 00/65469 | 11/2000 |
| WO | WO 01/04821 | 1/2001 |
| WO | WO 01/09752 | 2/2001 |
| WO | WO 01/09792 | 2/2001 |
| WO | WO 01/10090 | 2/2001 |
| WO | WO 01/39589 | 6/2001 |
| WO | WO 01/41355 | 6/2001 |
| WO | WO 01/84281 | 11/2001 |
| WO | WO 02/13047 | 2/2002 |
| WO | WO 2004/031986 | 4/2004 |
| WO | WO 2014/088895 | 6/2004 |
| WO | WO 2004/114160 | 12/2004 |
| WO | WO 2005/022348 | 3/2005 |
| WO | WO 2005/124619 | 12/2005 |
| WO | WO 2006/050278 | 5/2006 |
| WO | WO 2006/099081 | 9/2006 |
| WO | WO 2007/004158 | 1/2007 |
| WO | WO 2007/106393 | 9/2007 |
| WO | WO 2008/021061 | 2/2008 |
| WO | WO 2008/022289 | 2/2008 |
| WO | WO 2008/042614 | 4/2008 |
| WO | WO 2008/054403 | 5/2008 |
| WO | WO 2008/147918 | 12/2008 |
| WO | WO 2009/117468 | 9/2009 |
| WO | WO 2009/117518 | 9/2009 |
| WO | WO 2010/132492 | 11/2010 |
| WO | WO 2013/009920 | 1/2013 |
| WO | WO 2014/018900 | 1/2014 |
| WO | WO 2014/137759 | 9/2014 |

OTHER PUBLICATIONS

U.S. Appl. No. 12/705,511, filed Feb. 12, 2010, Bargoli et al.
"Consumers Gain Immediate and Full Access to Credit Score Used by Majority of U.S. Lenders." PR Newswire, ProQuest Copy; Mar. 19, 2001; p. 1.
"Debt Settlement: Watch Video on how to Pay Your Debt Faster", http://www.debtconsolidationcare.com/debt-settlement.html printed Jan. 9, 2013 in pp. 6.
Ettorre, Paul Kahn on Exceptional Marketing, Management Review, vol. 38(11), Nov. 1994, pp. 48-51.
Expensr.com http://www.expensr.com/ as retrieved on Sep. 17, 2008.
Ideon, Credit-Card Registry that Bellyflopped this Year, is Drawing some Bottom-Fishers, The Wall Street Journal, Aug. 21, 1995, pp. C2.
"Japan's JAAI system appraises used cars over internet", Asia Pulse, Mar. 3, 2000.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Loshin, Intelligent Enterprise: Better Insight for Business Decisions, "Value-Added Data: Merge Ahead", Feb. 9, 2000, vol. 3, No. 3, pp. 5.
Miller, Joe, "NADA used-car prices go online", Automotive News, Jun. 14, 1999, p. 36.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settiernent-qualifications.shtml printed Jan. 9, 2013 in 2 pages.
"Resolve Debt for Less: With Help from Freedom Financial" http://www.debtsettlementusa.com/ printed Jan. 9, 2013 in 6 pages.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
"Settling Your Debts—Part 1 in Our Debt Settlement Series", http://www.creditinfocenter.com/debt/settle_debts.shtml printed Jan. 9, 2013 in 6 pages.
Tao, Lixin, "Shifting Paradigms with the Application Service Provider Model"; Concordia University, Canada; IEEE; Oct. 2001.
"WashingtonPost.com and Cars.com launch comprehensive automotive web site for the Washington area", PR Newswire, Oct. 22, 1998.
International Search Report and Written Opinion for Application No. PCT/US09/60393, , dated Dec. 23, 2009.
International Search Report and Written Opinion for Application No. PCT/US09/37565, , dated May 12, 2009.
International Search Report and Written Opinion for Application No. PCT/US10/34434, , dated Jun. 23, 2010.
International Search Report and Written Opinion for Application No. PCT/US2012/046316, dated Sep. 28, 2012.
"A New Approach to Fraud Solutions", BasePoint Science Solving Fraud, pp. 8, 2006.
"ACS Company Birch & Davis Wins Texas CHIP Contract," PR Newswire, Section: Financial News, May 17, 2000, Dallas, TX, pp. 3.
Actuate, "Delivering Enterprise Information for Corporate Portals", White Paper, 2004, pp. 1-7.
Aharony et al., "Social Area Networks: Data Networking of the People, by the People, for the People," 2009 International Conference on Computational Science and Engineering, May 2009, pp. 1148-1155.
Akl, Selim G., "Digital Signatures: A Tutorial Survey," Computer, Feb. 1983, pp. 15-24.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"An Even Better Solution to Financing Elective Surgery . . . ", Unicorn Financial, pp. 7, http://web.archive.org/web/

(56) References Cited

OTHER PUBLICATIONS

20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.htmi (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm.(1 of 3) [Oct. 20, 2008 9:49:18 AM].
Bitran et al., "Mailing Decisions in Catalog Sales Industry", Management Science (JSTOR), vol. 42, No. 9, pp. 1364-1381, Sep. 1996.
Boss, Shira J. "Elective Surgery Without the Plastic: Low-Interest Medical Financing Provides Alternative to Credit Cards," factiva, Crain's New York Business, 2 pgs., dated Jun. 22, 1998.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Dec. 2001. Techniques, www.CardForum.com, vol. 5 No. 10, Dec. 2001.
Census Geography, Excerpted from the Geographic Reference Manual, Nov. 1994, pp. 5.
Check, http://check.me/ printed Feb. 5, 2014 in 3 pages.
Cheney, Karen, "Fix Your Nose, If You Wish, But Not With This New Loan," Money Magazine, vol. 27, No. 5, 1 pg., dated May 1, 1998.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
"Credit Information Bureaus and 'CIBIL'", http://www.icicibank.com/cibil.html printed Aug. 22, 2012 in 3 pages.
Cohen et al., "Optimizer: IBM's Multi Echelon Inventory System for Managing Service Logistics", Interfaces, vol. 20, pp. 65-82, Jan.-Feb. 1990.
"CreditCheck Monitoring Services," Dec. 11, 2000, pp. 1, lines 21-23.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
DiBartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Copyright 2000.
Downes et al., Dictionary of Finance and Investment Terms, Fifth Edition, 1998, pp. 332-333.
Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.
eFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Elmasri et al., "Fundamentals of Database Systems, Third Edition (Excerpts)", Jun. 2000, pp. 253, 261, 268-270, 278-280, 585, 595.
Equifax Consumer Credit Report http://www.equifax.com/home/ as retrieved on Sep. 17, 2008.
Experian Consumer Credit Report http://www.experian.com/, as retrieved on Sep. 17, 2008.
Experian, Custom Strategist and Qualifile from Funds, 2000, in 2 pages.
Experian, "Enabling e-business", White Paper, Jan. 2001, pp. 21.
Experian, "Instant Prescreen: Offer preapproved credit at the point of sale", Oct. 2000, pp. 2.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.

(56) References Cited

OTHER PUBLICATIONS

Experian: Mosaic UK—Optimise the Value of Your Customers and Locations, Now and in the Future, Brochure, Jun. 2012, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
Experian, "Experian Rental Payment Data," http://www.experian.com/rentbureau/rental-data.html printed Nov. 22, 2013 in 2 pages.
FamilySecure.com; "Identity Theft Protection for the Whole Family | FamilySecure.com" http://www.familysecure.com/, as retrieved on Nov. 5, 2009.
Felsenthal, Edward, "Health Costs; Managed Care Helps Curb Costs, Study Says," The Wall Street Journal, dated Aug. 12, 1991.
Fenner, Peter, "Mobil Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W&VR-2.0 as printed Dec. 17, 2009, pp. 5.
"Fighting the New Face of Fraud", FinanceTech, http://www.financetech.com/showArticie.jhtml?articleID=167100405, Aug. 2, 2005.
"Financing Medical Procedures A Lucrative But Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, p. 319.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Garcia-Molina, "Database Systems: The Complete Book", Prentice Hall, 2002, pp. 713-715.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, No. 2, pp. 20-28, Spring 1994, ProQuest ID 590096.
Henry, M.D., Kimberly A., "The Face-Lift Sourcebook," copyright 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
ID Analytics, "ID Analytics® Consumer Notification Service" printed Apr. 16, 2013 in 2 pages.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
Inderfurth et al., "Decision Support for Spare Parts Acquisition in Post Product Life Cycle", Central European Journal of Operations Research, vol. 16, pp. 17-42, 2008 [Initially published online Dec. 21, 2007].
IndiCareTM, On-Line Patient Assistant Program, Website Users Manual, JBI Associates, LLC, 1997.
"Intelligent Miner Applications Guide", IBM Corp., Apr. 2, 1999, Chapters 4-7, pp. 33-132.
Jaro, Matthew A., "Probabilistic Linkage of Large Public Health Data Files," Statistics in Medicine,1995, vol. 14, pp. 491-498.
Käki, Anssi, "Forecasting in End-Of-Life Spare Parts Procurement", Master's Thesis—Helsinki University of Technology System Analysis Laboratory, Jul. 27, 2007.
Kent, Heather, "Huge declines in price as competition heats up in Vancouver's booming laser-surgery market," CMAJ, Oct. 5, 1999; 161 (7), pp. 857-858.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Krupp, James A.G.; "Forecasting for the Automotive Aftermarket"; The Journal of Business Forecasting Methods & Systems; Winter 1993-1994; 12, 4; ABI/Inform Global; pp. 8-12.
Lan, Joe, "The Top Portfolio Management Software," http://www.aaii.com/computerizedinvesting/articie/the-top-portfolio-management-software, Includes Discussion thread, Fourth Quarter 2011, pp. 17.
Lapide, Larry, "New Developments in Business Forecasting", The Journal of Business Forecasting, pp. 12-14, Spring 2002.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lorette, Kristie, "How to Successfully Dispute Inaccuracies on Your Credit Report," http://web.archive.org/web/20110531184149/http://

(56) References Cited

OTHER PUBLICATIONS www.quizzle.com/blog/2011/03/how-to-successfully-dispute-inaccuracies-on-your-credit-report/, Mar. 25, 2011, in * pages.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
McNamara, Paul, "Start-up's pitch: The Envelope, please," Network World, Apr. 28, 1997, vol. 14, No. 17, p. 33.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008.3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
Merriam Webster's Collegiate Dictionary, 10th Edition, 1999, p. 79.
MicroBilt, "PRBC Credit Reporting Agency—Payment Reporting Builds Credit," retrieved from <http://www.microbilt.com/nontraditional-credit-report.aspx> and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
Moore, John R., Jr. "Forecasting and Scheduling for Past-Model Replacement Parts" Management Science, Application Series, vol. 18, No. 4, Part 1, Dec. 1971, pp. B200-B213.
"Mosaic" (geodemography), available from http://en.wikipedia,org/wiki/Mosaic_(geodemography), as last modified Jul. 13, 2012. pp. 4.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009, pp. 5.
NewsRoom, "CIGNA Report Withdrawn as Foe Sees Opening," Insurance Regulator, State Survey, Sep. 9, 1996, vol. 8, Issue 34, pp. 4.

"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu~awatson/NextCardCase/NextCardAboutUs.htm printer Oct. 23, 2009 in 10 pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Packer, A. H., "Simulation and Adaptive Forecasting an Applied to Inventory Control", Operations Research, vol. 15, No. 4, pp. 660-679, Jul. 1965.
Pagano, et al., "Information Sharing in Credit Markets," Dec. 1993, The Journal of Finance, vol. 48, No. 5, pp. 1693-1718.
"Parse", Definition from PC Magazine Encyclopedia, http://www/pcmag.com/encyclopedia_term 0,2542,t=parse&i=48862,00.asp as downloaded Mar. 5, 2012.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
PersonalCapital.com, http://www.personalcapital.com/how-it-works printed Feb. 5, 2014 in 5 pages.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Planet Receipt—Home, http://www.planetreceipt.com/home printed Oct. 16, 2012 in 2 pages.
Planet Receipt—Solutions & Features, http://www.planetreceipt.com/solutions-features printed Oct. 16, 2012 in 2 pages.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
Ramaswamy, Vinita M., Identity-Theft Toolkit, The CPA Journal, Oct. 1, 2006, vol. 76, Issue 10, pp. 66-70.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
"Recognition and use by Appraisers of Energy-Performance Benchmarking Tools for Commercial Buildings," prepared by the Institute for Market Transformation, NYSERDA, Feb. 2003, pp. 6.

(56) References Cited

OTHER PUBLICATIONS

Repici et al., "The Comma Separated Value (CSV) File Format", http://creativyst.com/Doc/Articies/CSV/CSV01.htm, Creativyst, Inc., 2002, pp. 10.
Roos, Gina, "Web-Based Service Helps OEMs Cure Parts Obsolescence Blues", Electronic Engineering Times, p. 86, Oct. 8, 2001, Dialog 09056737 78968668.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
Santarini, Michael, "Forecasts the Probably Obsolescence of Components—Module Predicts Parts Life", Electronic Engineering Times, Jan. 11, 1999, p. 48(1), Dialog 0607160353548246.
SAS, "SAS® Information Delivery Portal", Fact Sheet, 2008, in 4 pages.
Schneier, B. "Applied Cryptography", John Wiley & Sons, Second Edition, pp. 435-447, 1996.
Screenshot for Investment Account Manager v.2.8.3, published at http://www.aaii.com/objects/get/1642.gif by at least Aug. 30, 2011 in 1 page.
SearchAmerica, "Payment Advisor Suite™", Solutions, 2009, pp. 2.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", Pages 2, Copyright © Glyn Simpson 1998-2007, http://web.archive.org/web/20071018075531/http://money.mvps.org/faq/article/196.aspx.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stallings, W. "Cryptography and Network Security Principles and Practice", Prentice Hall, Second Edition, pp. 295, 297, Jul. 15, 1998.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Sullivan, Laurie, "Obsolete-Parts Program Thriving", EBN, Manhasset, Issue 1296, p. 26, Jan. 2002, ProQuest 10 101195090.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thomas, David, "Report on Networks and Electronic Communications Newcourt Credit Turns to Extranet Services / A PC Connects to 1,200 Users at Once", The Globe and Mail (Canada), Section: Report on Business Special Report, Nov. 12, 1996, pp. 2.
TRAkkER Corporation website, trakkercorp.com, TRAkkER Software Description, May 26, 2000, available at http://web.archive.org/web/20000526234204/http://trakkercorp.com/page4.html.
TransUnion Consumer Credit Report http://www.transunion.com/, as retrieved on Sep. 17, 2008.
US Legal, Description, http://www.uslegalforms.com/us/US-00708-LTR.htm printed Sep. 4, 2007 in 2 pages.
Various Posts from the http://www.2p.wrox.com Forums: http://web.archive.org/web/2005045221950/http://p2p.wrox.com/topic.asp?TOPIC_ID=6513, dated Nov. 15, 2003-Oct. 7, 2004.
Washington State Office of Public Defense, "Criteria and Standards for Determining and Verifying Indigency," dated Feb. 9, 2001.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.—ssi.html.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
Webpage printed out from http://www.jpmorgan.com/cm/ContentServer?c=TS_Content&pagename=jpmorgan%2Fts%2FIS_Content%2FGeneral&cid=1139403950394 on Mar. 20, 2008, Feb. 13, 2006, New York, NY.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Webster, Lee R., "Failure Rates & Life Cycle Costs", Consulting-Specifying Engineer; 23, 4; ABI/INFORM Global, Apr. 1998, p. 42.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Wesabe.com http://www.wesabe.com/, as retrieved on Sep. 17, 2008.
Williams, Mark, "Results of the 1998 NASFAA Salary Survey", News from NASFAA, 1998.
Wilson, Andrea, "Escaping the Alcatraz of Collections and Charge-Offs", http://www.transactionworld.net/articles/2003/october/riskMgmt1.asp, Oct. 2003.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Working, Holbrook, "Statistical Laws of Family Expenditure", Journal of the American Statistical Association, pp. 43-56, vol. 38, American Statistical Association, Washington, D.C., Mar. 1943.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Zoot—Decision Engine, www.zootweb.com/decision_engine.html as printed on Mar. 3, 2008.
Zoot—Pre-Built Standard Attributes, www.zootweb.com/credit_attributes.html as printed Mar. 3, 2008.
Declaration of Paul Clark, DSc. for Inter Partes Review of U.S. Pat. No. 8,504,628 (Symantec Corporation, Petitioner), dated Jan. 15, 2014 in 76 pages.

(56) References Cited

OTHER PUBLICATIONS

Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.,* v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
International Search Report and Written Opinion in PCT Application No. PCT/US07/76152, dated Mar. 20, 2009.
Official Communication in Australian Patent Application No. 2012281182, dated Jul. 8, 2014.
Official Communication in European Patent Application No. 12811546.6, dated Nov. 25, 2014.
Official Communication in Russian Patent Application No. 2014101674/08, dated Dec. 15, 2014.
International Preliminary Report on Patentability and Written Opinion for Application No. PCT/US2012/046316, dated Jan. 14, 2014.
International Preliminary Report on Patentability for Application No. PCT/US2010/034434, , dated Feb. 4, 2014.
International Search Report and Written Opinion for Application No. PCT/US2013/052342, , dated Nov. 21, 2013.
International Preliminary Report on Patentability for Application No. PCT/US2013/052342, , dated Feb. 5, 2015.
Official Communication in Australian Patent Application No. 2013356451, dated Jun. 22, 2015.
Official Communication in European Patent Application No. 13860724.7, dated May 21, 2015.
International Search Report and Written Opinion for Application No. PCT/US2013/072102, , dated Apr. 18, 2014.
International Preliminary Report on Patentability and Written Opinion for Application No. PCT/US2013/072102, , dated Jun. 9, 2015.
International Search Report and Written Opinion for Application No. PCT/US2014/019142, , dated Jun. 20, 2014.
Chiba et al., "Mobility Management Schemes for Heterogeneity Support in Next Generation Wireless Networks", 3rd EuroNGI Conference on, 2007, pp. 143-150.
International Preliminary Report on Patentability and Written Opinion for Application No. PCT/US2014/019142, , dated Sep. 17, 2015.
Official Communication in Australian Patent Application No. 2012281182, dated May 19, 2015.
Official Communication in Australian Patent Application No. 2014203430, dated Aug. 15, 2015.
Official Communication in Chinese Patent Application No. 201280041782.2, dated Mar. 4, 2016.
Official Communication in European Patent Application No. 12811546.6, dated Sep. 18, 2015.
Official Communication in European Patent Application No. 14733951.9, dated Sep. 11, 2015.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Utility Application as filed in U.S. Appl. No. 09/653,595, dated Aug. 31, 2000.
Official Communication in Chinese Patent Application No. 201380006862.9, dated Aug. 2, 2016.
Official Communication in Chinese Patent Application No. 201480000626.0, dated Aug. 1, 2016.
Official Communication in Russian Patent Application No. 2014127000, dated Dec. 23, 2015.

\* cited by examiner

CONSUMER DATA REQUEST FULFILLMENT SYSTEM

BACKGROUND

Maintaining communication with consumers is an important part of creating a stable business. Sometimes, however, an entity may lose communication with a consumer if, for example, the consumer moves to a new location or gets a new telephone number. Sometimes reestablishing communications is easy. Other times, such as when a consumer has failed to repay a loan and does not desire communications with a lender, reestablishing communications may be difficult. Accordingly, there is tremendous value in making it possible for entities such as lenders, banks, credit card issuers, and/or collections agencies to maintain and/or re-open lines of communication with their customers and consumers.

DETAILED DESCRIPTION

Figure 1:
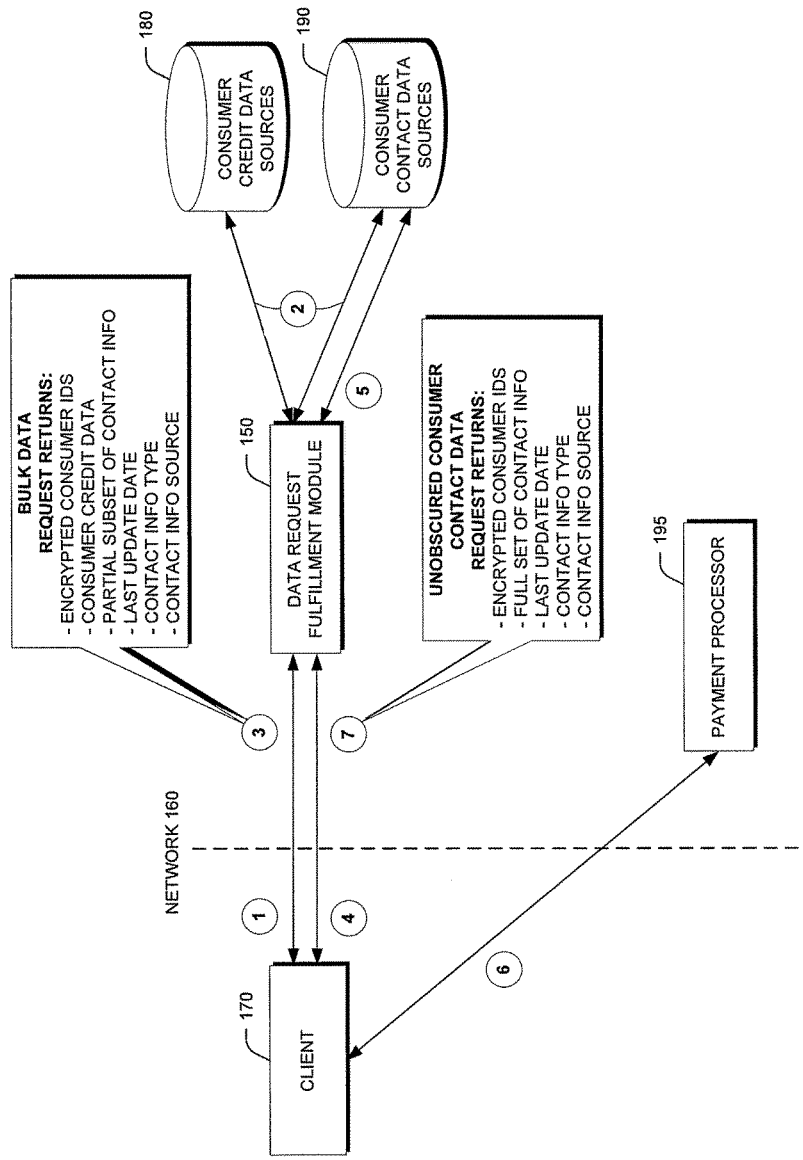
FIG. 1 is a data flow diagram illustrating an embodiment of a consumer data request fulfillment system.

In an embodiment, a consumer data request fulfillment system enables a client to easily and speedily obtain consumer contact data that the client does not already possess. The consumer data request fulfillment system provides bulk consumer data to a client upon request. The bulk data may include, for example, encrypted consumer identifiers (IDs) and a less than complete subset ("partial subset") of consumer contact information for a particular specified segment of consumers. The consumer data request fulfillment system may be operated by an entity with access to contact information, such as, for example, a credit bureau, and the bulk data may be drawn from consumer credit data sources and consumer contact data sources that may or may not be operated by a credit bureau. The partial subset of consumer contact information may include, for example, the last three digits of a telephone number and/or a portion of a street address or email address. Additional customer contact information may also be provided such as, for example, contact information type and/or contact information source. For example, one piece of a partial subset of consumer contact information may be: 295; type: telephone number; source: credit issuer application. Alternatively, only the last three digits of the contact information (such as, 295) may be provided or only the last three digits of the contact information and the type may be provided.

When selecting the subset of information to provide, it may be useful to select a more unique set of data, such as the last three digits of the phone number, rather than the first three digits of the number, which is the area code. In addition, it may be useful to the amount of data that will allow the client to determine whether it already has the contact information, balancing enough data to allow the comparison to be meaningful (for example, needing to provide more than just ".com" for the email address) but not too much data where the client can determine the full set of information without purchasing the remainder of the data (for example, providing the entire email address except for the ".com" at the end).

After receiving the bulk consumer data, the client has the opportunity to compare the partial subset of consumer contact information with contact information that the client may already possess for particular consumers. If the partial subset of consumer contact information does not match the contact information the client already possess, the client may then request from the consumer data request fulfillment system a full set of consumer contact information. For example, the client may send a request for consumer contact information by identifying particular consumers by their consumer IDs. The consumer data request fulfillment system will then provide the full set of consumer contact information to the client. The requests and request fulfillments are advantageously accomplished automatically by the consumer data request fulfillment system, enabling the client to obtain the consumer contact information it is missing conveniently and rapidly.

The partial subset of consumer contact information may be sent to a client in conjunction with a set of consumer credit data and encrypted consumer identifiers (IDs) already being sent to a client on a periodic basis.

An example transaction of the consumer data request fulfillment system according to an embodiment of the present disclosure may be instructive. Such a transaction may proceed, for example, as follows:

1. Client requests from an entity data relating to set of its customers each identified by an ID.
2. Entity provides the client with bulk data in response to the request. The bulk data includes, for each consumer identified by an ID:
   a. Encrypted consumer ID.
   b. Partial subset of consumer contact information (for example, 295), and for each partial subset of consumer contact information, the following may also be provided:
      i. Contact information type (for example, telephone)
      ii. Contact information source (for example, public record)
3. Client desires contact information on consumer with an ID. Currently client has a telephone number for the consumer, 310-000-0000, but it has been disconnected. Client compares the partial subset of the telephone number provided by the entity to its own information, and finds that the partial subset of the telephone number is different (that is, the last three digits, 295, do not match the last three digits, 000).
4. Client transmits request to entity for a full set of consumer contact information, identifying the particular consumer by its encrypted consumer ID.
5. Entity responds to request by providing the full consumer telephone number to the client.

In other embodiments, the client's requests could be based on other criteria than by identifier and may be combined with a request for other data. Another example is as follows:

1. Client requests from an entity (for example, a credit bureau) credit bureau data relating to middle-income consumers in the Los Angeles, Calif., area.
2. The credit bureau provides the client with the bulk data in response to the request. The bulk data includes, for each consumer that falls into the specified category (for example, middle-income individuals in the Los Angeles, Calif. area):

a. Encrypted consumer IDs.
b. Consumer credit data.
c. Partial subset of consumer contact information (for example, partial email address with first letter and domain name) along with:
   i. Contact information type
   ii. Contact information source
   iii. Last update date indicating that last time the particular piece of contact information was updated in the consumer contact data sources
3. Client compares the partial subset of consumer contact information provided by the credit bureau with its own information, and finds that there are 1458 records where the information is different.
4. Client transmits request to credit bureau for a full set of consumer contact information for the 1458 consumers, identifying each of the particular consumers by its encrypted consumer ID.
5. Credit bureau responds to request by providing the full set of email address information to the client.

The previous instructive transactions are only illustrative examples of embodiments of the consumer data request fulfillment system, and it is to be understood that more or fewer communications may be involved, and/or the communications may happen in a different order. Additionally, more or less, or different types of, information may be passed between the client and the entity. As described in detail below, the client is typically required to provide payment for the data furnished by the entity. Also, as noted above, the consumer data request fulfillment system may be operated by an entity other than a credit bureau.

As used herein, the terms "individual" and/or "consumer" may be used interchangeably, and should be interpreted to include applicants, customers, single individuals as well as groups of individuals, such as, for example, families, married couples or domestic partners, and business entities.

More particularly, the terms "individual" and/or "consumer" may refer to: an individual subject of the consumer data request fulfillment system (for example, an individual person whose credit bureau data is being provided and/or contact information is being provided). The terms "customer" and/or "client" may refer to: a large receiver or purchaser of the data provided by the consumer data request fulfillment system (for example, a lender that is receiving a credit data and/or contact information on individuals); and/or a small (or individual) receiver or purchaser of the consumer credit and/or contact data or information that is provided and/or produced by the consumer data request fulfillment system.

In general, however, for the sake of clarity, the present disclosure usually uses the term "consumer" to refer to an individual subject of the consumer data request fulfillment system, the term "customer" or "client" to refer to a receiver or purchaser of the information provided by the consumer data request fulfillment system.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIGURES

FIG. 1 is a data flow diagram showing an embodiment of the consumer data request fulfillment system. The consumer data request fulfillment system includes a network 160, a client 170, a data request fulfillment module 150, consumer credit data sources 180, consumer contact data sources 190, and a payment processor 195.

In the consumer data request fulfillment system of FIG. 1, the client 170 is in communication with the data request fulfillment module 150 and the payment processor 195 over the network 160. Further, the data request fulfillment module 150 is in communication with the consumer credit data sources 180 and the consumer contact data sources 190.

Client 170 may be any receiver or purchaser of the data provided by the consumer data request fulfillment system. For example, the client 170 may be a lender, bank, credit card issuer, and/or collections agency.

The payment processor 195 may be any entity employed or used by the operator of the consumer data request fulfillment system to accept and process payments from clients. For example, the payment processor 195 may be a credit card transaction processor or other payment processor as known in the art. Preferably the payment processor communicates over the network 160 and may process many transactions and/or payments rapidly in real-time. Alternatively, the payment processor 195 may communicate over another type of connection or proprietary network. When payments are processed, both the client and the operator of the consumer data request fulfillment system are preferably notified instantly or nearly instantly. Additionally, typically payments are processed in an automated way. For example, when a payment is required by the data request fulfillment module 150, the payment processor 195 and the client 170 are automatically notified. The client 170 may be notified by the data request fulfillment module 150 directly, or indirectly by the payment processor 195. Then, once payment is received from the client 170 and processed by the payment processor 195, the data request fulfillment module 150 is automatically notified, either directly or indirectly. Thus, payment requests and notifications of payment completion are preferably accomplished quickly and automatically, facilitating rapid turnaround time between requests from the client 170 and fulfillment by the data request fulfillment module 150.

In the embodiment of FIG. 1, the network 160 comprises one or more of a LAN, WAN, and/or the Internet, for example, via a wired, wireless, or combination of wired and wireless communications link. The network 160 communicates with various computing devices and/or other electronic devices via wired or wireless communication links. In an embodiment, communications between the data request fulfillment module 150 and the consumer credit data sources 180 and consumer contact data sources 190 may be over a network similar to network 160. Alternatively, communications between data request fulfillment module 150 and consumer credit data sources 180 and consumer contact data sources 190 may be over a dedicated network or communications link, whether wired or wireless.

In an embodiment the data request fulfillment module 150 is implemented as a part of a computing system. In another embodiment, the data request fulfillment module 150 is implemented as a dedicated computing device. Further details concerning the implementation of the data request fulfillment module 150 and other aspects of the consumer data request fulfillment system, including the communications between the various components, will be described below in reference to FIG. 3.

The consumer credit data sources 180 and/or the consumer contact data sources 190 may include one or more internal and/or external databases, data sources, and physical data stores. The consumer credit data sources 180 may include internal and external data sources which store, for example, credit bureau data (for example, credit bureau data from File One™, including, for example, balances on lines of credit, and/or delinquency, among other things) and/or historical trade line data, among other things. The consumer contact data sources 190 may include internal and external data sources (such as, for example, MetroNet™) which store, for example, consumer contact information such as telephone numbers (such as, for example, land line and mobile), physical addresses (such as, for example, street addresses and post office boxes), email addresses, and so forth. Sources of consumer contact data may include, for example, consumer credit data (such as, for example, information from creditors, lenders, banks, and so forth) and/or publicly available records, among others. In some embodiments, one or more of the databases or data sources may be implemented using a relational database, such as Sybase, Oracle, CodeBase, and Microsoft® SQL Server, as well as other types of databases such as, for example, a flat file database, an entity-relationship database, and object-oriented database, and/or a record-based database.

The operation of the consumer data request fulfillment system, according to an embodiment, will now be described in reference to the data flow of FIG. 1. It should be understood that the following data flow is only illustrative, and should not be read to limit the scope of any of the claims of the present application. In particular, it is to be understood that more or fewer communications may be involved, and/or the communications may happen in a different order. Additionally, more or less, or different types of, information may be passed between the client and the credit bureau.

Referring to FIG. 1, at 1 the client 170 makes a request for credit data. The request is transmitted over the network 160 to the data request fulfillment module 150. The request may include identification of particular consumers about whom the client 170 would like to gather credit data. Alternatively, the request may include information about a particular segment, demographic, and/or group of consumers about whom the client 170 is interested.

At 2, the data request fulfillment module 150 processes the request by, among other things, accessing the consumer credit data sources 180 and consumer contact data sources 190. If a segment, demographic, and/or group of consumers has been identified by the client 170, the data request fulfillment module 150 may first determine the particular consumers within the segment, demographic, and/or group. For example, if the client 170 specifies "middle-income individuals in the Los Angeles, Calif. area," the data request fulfillment module 150 may first determine the identities of the consumers that fall within that group. This may be accomplished by accessing consumer information from consumer credit data sources 180, by accessing information from consumer contact data sources 190, by accessing information from both consumer credit data sources 180 and consumer contact data sources 190, or by accessing demographic information and consumer identity information from sources not shown in FIG. 1. Once the identities or identifiers of the consumers are known, their credit data is accessed from the consumer credit data sources 180.

Optionally, in 2 the identified consumers' contact data and/or information is accessed from the consumer contact data sources 190. In an embodiment, the client 170 may specify whether contact data is desired. In another embodiment, contact data may be automatically be provided. In either case, as mentioned above the contact data may include, for example, telephone numbers (land line and mobile), physical addresses (such as street addresses and post office boxes), email addresses, and so forth. For each item of consumer contact information, a contact information type and a contact information source may also be included. The contact information type indicates what type of information the contact information is. For example, contact information types may include, but are not limited to, first telephone number, second telephone number, third telephone number, home telephone, work telephone, facsimile number, home address, work address, email address, cell, non-cell, and so forth. The contact information source indicates the source of the contact information. For example, the contact information sources may include, by are not limited to, published white pages, credit issuer application, credit issuer, public record, other, unknown, and so forth. For each consumer, none, one, or many piece of contact information may be accessed and, after partial obfuscation as described below, provided to client 170. For example, for a given consumer, multiple telephone numbers and/or physical addresses may be provided.

Continuing in 2, if consumer contact information is going to be provided to the client 170, once the contact information is located, a partial subset of the information is obtained. In other embodiments, the entire set of information is obtained, but truncated. In an embodiment, a portion of each piece of contact information is designated and/or identified to be provided to the client 170. The portion designated is selected such that the contact information may be identified by the client, and compared to their own contact information, but not be useable by the client. For example, for a telephone number, the last three digits of the number may be designated (for example, 295 or XXX-XXX-X295). Thus, in this example, the partial subset of the telephone number or truncated telephone number provided to the client 170 would include only the last three designated digits. Alternatively, other portions of the telephone number, or more or fewer digits, may be designated. Similar criteria may be applied to other types of consumer contact information. For example, a physical address may be truncated by designating only the street name (for example, Main Street; or XXXX Main St., XXXXXXXXXX, XX XXXXX). Alternatively, the city and/or zip code may be designated (for example, Homeville, Calif.; or XXX X XXXX XXX, Homeville, Calif. XXXXX. For an email address, one, two, three, or more letters/numbers/symbols of the address may be designated (for example, john or johnXXXXXXXXX, john/.com or johnXXX@XXXX.com, john/@example.com or johnXXX@example.com, and so forth). As may be understood, designating more or less, or different parts of the contact information will provide the client 170 with more or less information, as may be desirable. Other designation criteria may be selected which, although not explicitly listed here, fall within the scope and spirit of the present disclosure. In an embodiment, the designated portion of the contact information is finally transmitted to the client 170, while the undesignated portion is not, thus advantageously reducing network usage and bandwidth. In other embodiments, the portion of the contact information not designated is simply modified (by, for example, replacing the data with X's or 0's), and whole information, including the modified portion, is finally transmitted to the client 170.

At 3, the requested data is provided to the client 170. The requested data provided to the client 170 is herein referred to as bulk data, as typically data pertaining to many consumers is provided simultaneously. The bulk data provided includes, for each consumer specified, encrypted consumer IDs, consumer credit data, and a partial subset of consumer contact information. Additionally, for each piece of contact information, the contact information type and contact information source may also be included. In an embodiment, only the partial subset of consumer contact information, not including the contact information type and source, is provided. Encrypted consumer IDs comprise encrypted, unique numerical identifiers for each consumer. The consumer IDs are encrypted so as to protect the identity of the consumers in the event the bulk data information is stolen or lost. Encryption of the consumer IDs may be implemented via any suitable cryptographic system, for example symmetric or asymmetric (such as, for example, public/private key), among others. In an embodiment, the consumer IDs are provided in an unencrypted form. In another embodiment, the consumer IDs are non-numerical.

Having received the bulk data, the client 170 has the opportunity to compare the received, partial subset of consumer contact information with any information the client 170 already possesses. For example, if the client 170 desires to contact a consumer, the client 170 may first look to its own consumer contact information. If the client's 170 contact information is non-existent for the particular consumer, or if it is no longer valid, the client 170 may then consider requesting a full set of consumer contact information via the consumer data request fulfillment system. It is desirable, however, that the client 170 first verify that the full set of consumer contact information will not be duplicative of information the client 170 already possesses. Thus, the client 170 may compare the partial subset of consumer contact information already received with the information previously possessed. For example, the client 170 may have a telephone number for consumer, 310-000-0000, but it has been disconnected. The client 170 may then compare the partial subset of the telephone number received as part of the bulk data request to their own information. If the client 170 finds that the partial subset of the telephone number is different (for example, the last three digits, 295, do not match the last three digits, 000), the client may then desire to request the full set of consumer contact information for that consumer. On the other hand, if the numbers match, then the client 170 may choose not to request the full set of consumer contact information for that consumer. Thus, the client 170 may advantageously save time and expense by utilizing the consumer data request fulfillment system.

At 4, the client 170 requests full sets of consumer contact information. The client 170 specifies in the request the particular consumers for whom a full set of consumer contact information is desired. Additionally, in an embodiment the client 170 may also specify the type of contact information desired, and/or the particular sources from which contact information is desired. Typically, the request will be for a subset of the consumers included in the bulk data request, although this may not always be the case. Consumers about whom a full set of consumer contact information is requested may be identified according to their encrypted consumer IDs, the designated portion of the partial subset of consumer contact information, and so forth. In an embodiment, the client 170 may request "all phones," or "all information" for a particular consumer. In an embodiment, the request may be accomplished as an interactive XML transaction, a batch file request, or some other computer-automated transaction or request.

At 5, the full set of consumer contact data request is received by the data request fulfillment module 150 and processed. The requested information is retrieved from the consumer contact data sources 190 similar to 2 above, however the retrieved information is not less than the full set of information as it was in 2.

At 6, the client 170 optionally pays for the full set of data. This is accomplished when the client 170 provides payment through the payment processor 195, and the payment is verified. The payment processor 195 may also be in communication with the data request fulfillment module 150. For example, in an embodiment, the data request fulfillment module 150 may notify the payment processor 195 of the request for payment, and the price to be charged. The payment processor 195 may then initiate communication with the client 170. Once the client 170 has tendered payment, and the payment is verified, the data request fulfillment module 150 may be notified by the payment processor 195. Preferably, the payment request, payment receipt, payment verification, and payment notification are accomplished automatically. Thus, the client may rapidly provide payment and prevent delays in delivery of the requested data. In an embodiment, the client 170 may pre-pay for the requested data. The price of the requested data may vary depending on the amount of the data requested, the type of data requested, the specificity of the data requested, and so forth. In an embodiment, the full set of consumer contact information is provided at an additional cost to other costs the client is paying for other data requests, such as the consumer credit data. In an embodiment, the additional cost for the full set of consumer contact information is dependent on the number of consumers about whom data is being provided. For example the charge may be on a per-hit, per-request, per-consumer, and/or per-datum basis. For example, payment on a per-hit basis would include a fee for each piece of contact information requested. The cost for the full set of consumer contact information may vary based on the amount of data requested and/or the type of data requested for each consumer. For example, cell (or mobile) telephone numbers may cost more or less than land-line telephone numbers and/or data from a credit issuer application may cost more or less that data from public records. Payment is tendered, verified, and the data request fulfillment module 150 is notified.

In another embodiment, the partial subset of consumer contact information is provided as part of the bulk data at no additional cost where as in other embodiments, there may be a charge.

At 7, the requested full set of consumer contact data is provided to client 170. The full set of consumer contact data provided may include, for each consumer specified, encrypted consumer IDs and full set of consumer contact information. Additionally, for each piece of full set of consumer contact information, a last update date, the contact information type, and contact information source may also be included. The last update date indicates that last time the particular piece of contact information was updated in the consumer contact data sources 190. The last update date information may provide an additional means for identifying new contact information, and requesting information again in the future. Advantageously, the client 170 may request a full set of consumer contact information many times and/or at any time. The consumer data request fulfillment system enables fulfillment of the requests on a per-consumer basis.

Additionally, requests may be automatically fulfilled, optionally including payment for the data.

Figure 2:
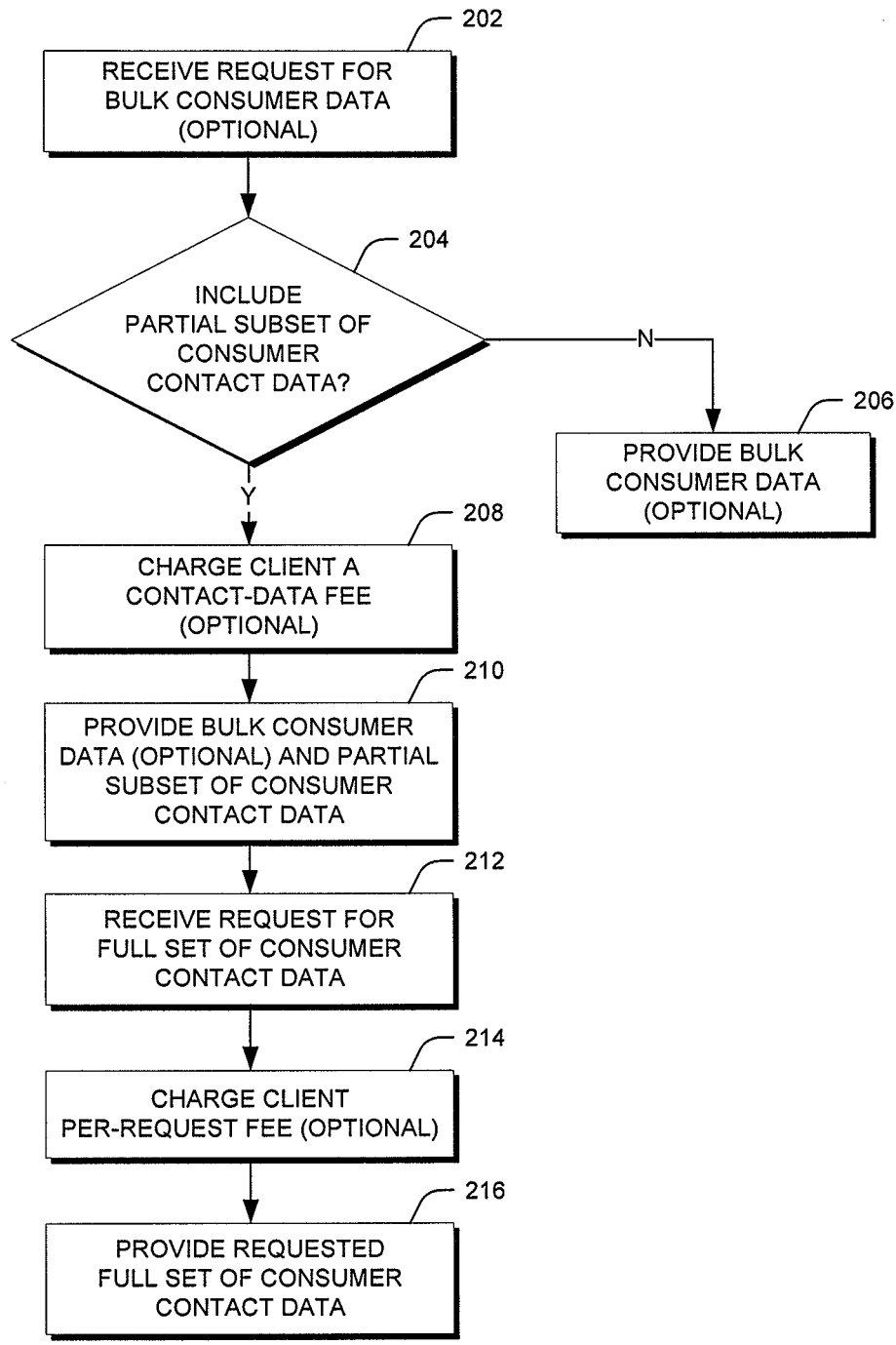
FIG. 2 is a flow chart illustrating an embodiment of the consumer data request fulfillment system.

FIG. 2 is a flow chart showing an embodiment of the consumer data request fulfillment system. The flow chart of FIG. 2 illustrates an exemplary method of fulfilling a request for consumer credit and contact data with the consumer data request fulfillment system. The exemplary method may be stored as a process accessible by the data request fulfillment module 150 and/or other components of a computing system 100, as will be described in reference to FIG. 3 below. Depending on the embodiment, certain of the blocks described below may be removed, others may be added, and the sequence of the blocks may be altered.

Beginning in optional block 202, a request for bulk consumer data is received by the data request fulfillment module 150. The request for bulk consumer data may come from client 170, and, as described with reference to 1 of FIG. 1 above, may include, for example, identification of a specific consumer, a group of consumers, and/or a population of consumers designated by, for example, some demographic indicator. In other embodiments, the data request fulfillment module 150 stores the customer's request criteria such that the information is retrieved and does not need to be sent by the client 170.

At block 204, the data request fulfillment module 150 determines whether the request for bulk consumer data includes a request for a partial subset of consumer contact data. If not, then the process continues to block 206, where the bulk consumer data request is fulfilled. The request is fulfilled by the data request fulfillment module 150, which accesses the consumer credit data sources 180 to retrieve the consumer credit data associated with the consumers identified in the request. The data is then transmitted to the client 170 over the network 160. This process occurs substantially as described above with references to 1, 2, and 3 of FIG. 1, with the exception that the consumer contact data sources 190 are generally not accessed, and the partial subset of consumer contact information is generally not transmitted to the client 170. Thus, the bulk data request returns encrypted consumer IDs and consumer credit data to the client 170. In an embodiment, the client 170 makes a payment for the bulk consumer data via the payment processor 195 before the data is delivered. The amount of the payment may depend on the type of request, as described above.

Returning to block 204 of FIG. 2, if the request does include a request for a partial subset of consumer contact information, then the data request fulfillment module 150 prepares the necessary partial subset of consumer contact information as described above in reference to 2 of FIG. 1. At optional block 208, the client 170 may optionally be charged a contact-data fee as described above in reference to 3 and 6 of FIG. 1. In an embodiment, the charge for the contact data may be in addition to a charge for the bulk consumer credit data as described above. At block 210, the request is fulfilled as the bulk consumer data (optional) and the partial subset of consumer contact data is transmitted by the data request fulfillment module 150, over the network 160, to the client 170. This is accomplished generally as described in reference to 3 of FIG. 1 above.

At block 212 of FIG. 2, a request is received by the data request fulfillment module 150 for a full set of consumer contact information. The request is generally provided by the client 170, substantially as described above with reference to 4 of FIG. 1. The request may then be fulfilled by the data request fulfillment module 150, as described in reference to 5 of FIG. 1. Then, at block 214 of FIG. 2, the client 170 is optionally charged a pre-hit fee for the full set of consumer contact information, as described in reference to 6 of FIG. 1. The client 170 may request a single piece of the full set of consumer contact information, multiple pieces of the full set of consumer contact information pertaining to a single consumer, or the full set of consumer contact information pertaining to many consumers. The fee charged will vary depending on the type of request. Finally, at block 216, the request for the full set of consumer contact information is fulfilled by the data request fulfillment module 150, as the data is transmitted to the client 170 over the network 160, as described with reference to 7 of FIG. 1.

Figure 3:
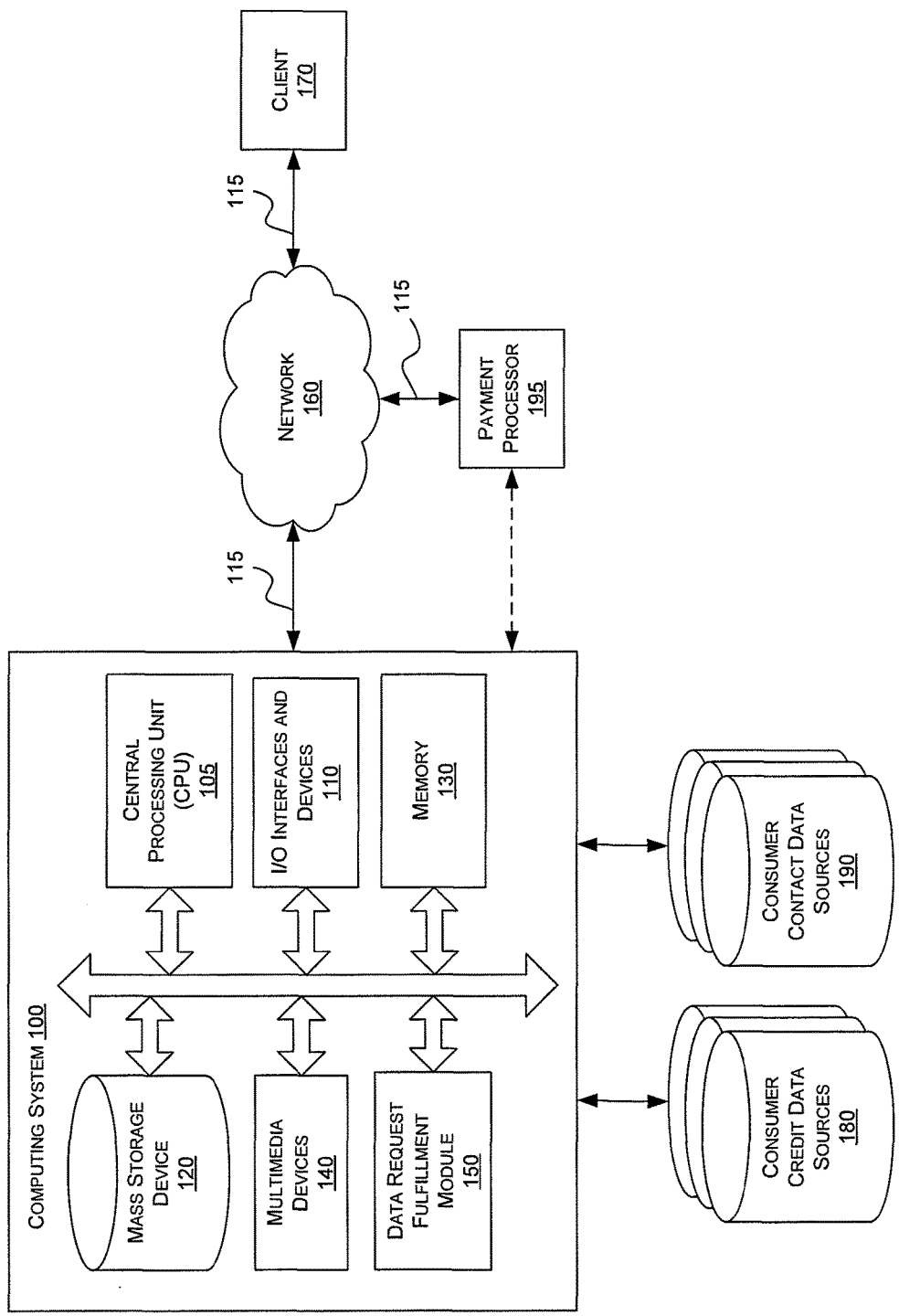
FIG. 3 is a block diagram showing an embodiment of the consumer data request fulfillment system.

Turning now to FIG. 3, a block diagram illustrating an embodiment of the consumer data request fulfillment system is shown. The consumer data request fulfillment system includes a data request fulfillment computing system 100 (or simply "computing system 100"), communication links 115, and, from FIG. 1, the network 160, the client 170, the payment processor 195, the consumer credit data sources 180, and the consumer contact data sources 190. Additionally, the computing system 100 includes a central processing unit (CPU) 105, input/output (I/O) interfaces and devices 110, a mass storage device 120, a memory 130, multimedia devices 140, and the data request fulfillment module 150.

In the consumer data request fulfillment system of FIG. 3, the computing system 100, the client 170, and the payment processor 195 are in communication with the network 160. The communication link 115 is the communications link between the various components of the revenue estimation system and the network 160. As shown by the dashed line, the payment processor 195 may optionally be in direct communication with the computing system 100. The consumer credit data sources 180 and consumer contact data sources 190 are in direct communication with the computing system 100, so as to provide a secure communications channel. In certain embodiments, the consumer credit data sources 180 and consumer contact data sources 190 may be in communication with the network 160, and/or may communicate with the computing system 100 over the network 160. The computing system 100 may be used to implement systems and methods described herein.

The computing system 100 includes computing devices, for example, a personal computer that is IBM, Macintosh, or Linux/Unix compatible or a server or workstation. In one embodiment, the computing system 100 comprises a server, a laptop computer, a smart telephone, a personal digital assistant, a tablet, for example. In one embodiment, the exemplary computing system 100 includes one or more CPU 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows 8, Windows Server, Unix, Linux, SunOS, Solaris, iOS, Blackberry OS, Android, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available I/O interfaces and devices 110, such as a keyboard, mouse, touchpad, and printer. In one embodiment, the I/O interfaces and devices 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of the revenue estimation system of FIG. 3, the I/O interfaces and devices 110 provide a communication interface to various external devices. In the embodiment of FIG. 3, the computing system 100 is electronically coupled to a network 160, which comprises one or more of a LAN, WAN, and/or the Internet, for example, via a wired, wireless, or combination of wired and wireless, communication link 115, as described above in reference to FIG. 1. The network 160 communicates with various computing devices and/or other electronic devices via wired or wireless communication links.

According to FIG. 3, in some embodiments information may be provided to the computing system 100 over the network 160 from one or more of the consumer credit data sources 180 and/or consumer contact data sources 190, as described above with reference to FIG. 1. In some embodiments, the consumer credit data sources 180 are the same as or overlap with the consumer contact data sources 190. The consumer credit data sources 180 and consumer contact data sources 190 may also be referred to as data stores and/or databases.

In the embodiment of FIG. 3, the computing system 100 includes the data request fulfillment module 150 that may be stored in the mass storage device 120 as executable software codes that are executed by the CPU 105. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 3, the computing system 100 is configured to execute the data request fulfillment module 150 in order to fulfill, for example, requests for consumer credit and contact data in accordance with the processes described with respect to FIGS. 1 and 2 above.

In general, the word "module," as used herein, refers to logic embodied in hardware or firmware, or to a collection of software instructions, possibly having entry and exit points, written in a programming language, such as, for example, Java, Lua, C and/or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In an embodiment, the consumer credit data sources 180 and consumer contact data sources 190 are provided by a credit bureau, and/or the data request fulfillment module 150 and consumer data request fulfillment system are operated by a credit bureau. Alternatively, one or more of the various components of the consumer data request fulfillment system may be provided by another entity. Clients that may receive the consumer credit and contact data include, but are not limited to: companies that make lending and underwriting decisions such as credit cards, banks, credit unions, auto financing companies, savings and loan companies, and/or mortgage and financing companies; collection agencies; and/or individual customers, such as individual persons.

In an embodiment, the full set of consumer contact information provided by the consumer data request fulfillment system is provided with an agreement by the client that the information furnished will only be used a single time, and that it may not be retained after that use, or after a certain period of time. In an embodiment, clients may be forbidden from reusing or storing the full set of consumer contact information.

Advantages of Some Embodiments

Maintaining communication with consumers is an important part of creating a stable business and making lending safe and effective, and can be useful for other purposes. Accessing additional consumer contact information is critical to maintaining communication with consumers when consumers' contact information changes or becomes unavailable. The present disclosure describes a consumer data request fulfillment system capable of quickly and automatically fulfilling requests for additional consumer data, including consumer contact information. Embodiments of the system advantageously integrate contact information into a credit data request system that many clients already have implemented. Clients may save expense as the partial subset of consumer contact information allows them to determine whether the additional contact information available through the consumer data request fulfillment system is additive to, or duplicative of, to information they are already possess. In an embodiment, only the designated portion (the partial subset portion) of the contact information is initially transmitted to the client, thus advantageously reducing network usage and bandwidth. Additionally, when requesting the full set consumer contact information, the client may request a single piece of full sets of consumer contact information, multiple pieces of full sets of consumer contact information pertaining to a single consumer, or full sets of consumer contact information pertaining to many consumers. Many individual requests may be made at specific times when the client is in need of additional information. Also, payment may be made on a per-hit, per-request, per-consumer, or per-datum basis, further reducing costs to clients.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process elements may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. Additionally, the term "subset" is used herein according to its ordinary meaning. In particular, a subset is understood to include none, some, or all of the members of a particular set.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the category spend computing system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the systems and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated.

What is claimed is:

1. A system for fulfilling a data request, the system comprising:
   a first physical data store configured to store consumer contact data; and
   a computing device in communication with the first physical data store and configured to:
      receive a first request from a requestor for bulk consumer data associated with a plurality of consumers, wherein:
         the first request includes at least:
            information indicative of the plurality of consumers, and
            an indication of a type of data item field of interest, and
         the type of the data item field of interest includes at least one of:
            telephone number, email address, or physical address;
      fulfill the first request by:
         accessing, from the first physical data store and based on both the information indicative of the plurality of consumers, a first plurality of consumer contact data items, wherein:

each of the first plurality of consumer contact data items is associated with at least a respective one of the plurality of consumers, and each of the plurality of consumers is associated with a respective unique consumer identifier;

further accessing, from the first physical data store and based on the indication of the type of data item field of interest, data item fields associated with each of the respective first plurality of consumer contact data items and matching the type of the data item field of interest, wherein:

each of the data item fields is associated with a respective source, and each of the data item fields includes at least one of: a telephone number, an email address, or a physical address;

identifying a preexisting rule for truncating data item fields matching the type of the data item field of interest;

processing the data item field associated with each of the respective first plurality of consumer contact data items by:

identifying, based on the preexisting rule, a first portion of the data item field for transmission to the requestor, wherein the first portion of the data item field is less than a full portion of the data item field, and wherein the first portion of the data item field is more uniquely identifying of a consumer associated with the consumer contact data item of the data item field than a second portion of the data item field; and truncating, based on the preexisting rule, the data item field to a truncated data item field that includes only the first portion of the data item field and not the second portion of the data item field;

encrypting the unique consumer identifiers associated with each of the plurality of consumers to generate respective encrypted unique consumer identifiers; and transmitting, to the requestor, the first plurality of consumer contact data items including:

the respective first plurality of consumer contact truncated data item field associated with each of the data items, and the respective encrypted unique consumer identifiers associated with consumers associated with each of the first plurality of consumer contact data items, wherein the second portion of each of the respective truncated data item fields is not transmitted when fulfilling the first request;

receive a second request from the requestor identifying a subset of the plurality of consumers by their respective encrypted unique consumer identifiers and requesting full consumer contact data associated with the subset of the plurality of consumers, wherein the subset of the plurality of consumers include consumers for whom updated consumer contact data is needed by the requestor based on a comparison of the truncated data item fields associated with the first plurality of consumer contact data items with consumer contact data already in possession of the requestor; and fulfill the second request by:

determining the unique consumer identifiers associated with respective ones of the subset of the plurality of consumers based on the respective encrypted unique consumer identifiers identified by the second request;

accessing, from the first physical data store and based on the unique consumer identifiers, a second plurality of consumer contact data items, wherein each of the second plurality of consumer contact data items is associated with at least a respective one of the subset of the plurality of consumers;

further accessing, from the first physical data store, data item fields associated with each of the respective second plurality of consumer contact data items, wherein each of the data item fields is associated with a respective source; and transmitting, to the requestor, the second plurality of consumer contact data items including:

the respective data item fields, wherein the respective data item fields are untruncated, the respective encrypted unique consumer identifiers associated with consumers associated with each of the second plurality of consumer contact data items, indications of the respective sources associated with the data item fields, and indications of respective last update dates associated with the data item fields.

2. The system of claim 1, wherein the first request includes a request for truncated consumer contact data.

3. The system of claim 1, the first physical data store storing both consumer credit data and consumer contact data.

4. The system of claim 1, wherein the first portion of each of the respective data item fields includes at least one of: one or more digits of a telephone number; one or more letters, numbers, or symbols of an email address; or one or more letters, numbers, or symbols of a physical address.

5. The system of claim 1, further comprising a second physical data store configured to store consumer credit data.

6. The system of claim 5, wherein the computing device is further configured to fulfill the first request by:

accessing, from the second physical data store, a consumer credit data item associated with at least one of the plurality of consumers; and transmitting, to the requestor, the consumer credit data item.

7. The system of claim 1, wherein the data item field associated with each of the respective first plurality of consumer contact data items comprises a respective telephone number, and wherein the first portion of each of the respective data item fields comprises at least one of: a last three digits of the telephone number, a last four digits of the telephone number, a last five digits of the telephone number, or a last six digits of the telephone number.

8. The system of claim 1, wherein the data item field associated with each of the respective first plurality of consumer contact data items comprises an email address, and wherein the first portion of each of the respective data item fields comprises at least one of: a first symbol of the email address, a first two symbols of the email address, or a first three symbols of the email address.

9. A computer-implemented method of fulfilling a data request, the method comprising:

under control of the one or more computing devices configured with specific computer executable instructions, receiving a first request from a requestor for bulk consumer data associated with a plurality of consumers, wherein:
  the first request includes at least:
    information indicative of the plurality of consumers, and
    an indication of a type of data item field of interest, and
  the type of the data item field of interest includes at least one of:
telephone number, email address, or physical address;
fulfilling the first request by:
  accessing, from a first physical data store and based on both the information indicative of the plurality of consumers, a first plurality of consumer contact data items, wherein:
    each of the first plurality of consumer contact data items is associated with at least a respective one of the plurality of consumers, and
    each of the plurality of consumers is associated with a respective unique consumer identifier;
  further accessing, from the first physical data store and based on the indication of the type of data item field of interest, data item fields associated with each of the respective first plurality of consumer contact data items and matching the type of the data item field of interest, wherein:
    each of the data item fields is associated with a respective source, and
    each of the data item fields includes at least one of: a telephone number, an email address, or a physical address;
  identifying a preexisting rule for truncating data item fields matching the type of the data item field of interest;
  processing the data item field associated with each of the respective first plurality of consumer contact data items by:
    identifying, based on the preexisting rule, a first portion of the data item field for transmission to the requestor, wherein the first portion of the data item field is less than a full portion of the data item field, and wherein the first portion of the data item field is more uniquely identifying of a consumer associated with the consumer contact data item of the data item field than a second portion of the data item field; and
    truncating, based on the preexisting rule, the data item field to a truncated data item field that includes only the first portion of the data item field and not the second portion of the data item field;
  encrypting the unique consumer identifiers associated with each of the plurality of consumers to generate respective encrypted unique consumer identifiers; and
  transmitting, to the requestor, the first plurality of consumer contact data items including:
    the respective first plurality of consumer contact truncated data item field associated with each of the data items, and
    the respective encrypted unique consumer identifiers associated with consumers associated with each of the first plurality of consumer contact data items,
    wherein the second portion of each of the respective truncated data item fields is not transmitted when fulfilling the first request;
receiving a second request from the requestor identifying a subset of the plurality of consumers by their respective encrypted unique consumer identifiers and requesting full consumer contact data associated with the subset of the plurality of consumers, wherein the subset of the plurality of consumers include consumers for whom updated consumer contact data is needed by the requestor based on a comparison of the truncated data item fields associated with the first plurality of consumer contact data items with consumer contact data already in possession of the requestor; and
fulfilling the second request by:
  determining the unique consumer identifiers associated with respective ones of the subset of the plurality of consumers based on the respective encrypted unique consumer identifiers identified by the second request;
  accessing, from the first physical data store and based on the unique consumer identifiers, a second plurality of consumer contact data items, wherein each of the second plurality of consumer contact data items is associated with at least a respective one of the subset of the plurality of consumers:
  further accessing, from the first physical data store, data item fields associated with each of the respective second plurality of consumer contact data items, wherein each of the data item fields is associated with a respective source; and
  transmitting, to the requestor, the second plurality of consumer contact data items including:
    the respective data item fields, wherein the respective data item fields are untruncated,
    the respective encrypted unique consumer identifiers associated with consumers associated with each of the second plurality of consumer contact data items,
    indications of the respective sources associated with the data item fields, and
    indications of respective last update dates associated with the data item fields.

10. The computer-implemented method of claim 9, wherein
  the subset of the plurality of consumers comprises an entire set of the plurality of consumers.

11. The computer-implemented method of claim 9,
  wherein the first portion of each of the respective data item fields at least one of: one or more digits of a telephone number; one or more letters, numbers, or symbols of an email address; or one or more letters, numbers, or symbols of a physical address.

12. The computer-implemented method of claim 9, further comprising a second physical data store configured to store consumer credit data.

13. The computer-implemented method of claim 12, wherein fulfilling the first request further comprises:
  accessing, from the second physical data store, a consumer credit data item associated with at least one of the plurality of consumers; and
  transmitting, to the requestor, the consumer credit data item.

14. A computer-readable, non-transitory storage medium having at least one computer-executable component for fulfilling consumer data requests, the at least one computer-executable component comprising:
a data request fulfillment module operative to:
receive a first request from a requestor for bulk consumer data associated with a plurality of consumers, wherein:
the first request includes at least:
information indicative of the plurality of consumers, and
an indication of a type of data item field of interest, and
the type of the data item field of interest includes at least one of:
telephone number, email address, or physical address;
fulfill the first request by:
accessing, from a first physical data store and based on both the information indicative of the plurality of consumers, a first plurality of consumer contact data items, wherein:
each of the first plurality of consumer contact data items is associated with at least a respective one of the plurality of consumers, and
each of the plurality of consumers is associated with a respective unique consumer identifier;
further accessing, from the first physical data store and based on the indication of the type of data item field of interest, data item fields associated with each of the respective first plurality of consumer contact data items and matching the type of the data item field of interest, wherein:
each of the data item fields is associated with a respective source, and
each of the data item fields includes at least one of: a telephone number, an email address, or a physical address;
identifying a preexisting rule for truncating data item fields matching the type of the data item field of interest;
processing the data item field associated with each of the respective first plurality of consumer contact data items by:
identifying, based on the preexisting rule, a first portion of the data item field for transmission to the requestor, wherein the first portion of the data item field is less than a full portion of the data item field, and wherein the first portion of the data item field is more uniquely identifying of a consumer associated with the consumer contact data item of the data item field than a second portion of the data item field; and
truncating, based on the preexisting rule, the data item field to a truncated data item field that includes only the first portion of the data item field and not the second portion of the data item field;
encrypting the unique consumer identifiers associated with each of the plurality of consumers to generate respective encrypted unique consumer identifiers; and
transmitting, to the requestor, the first plurality of consumer contact data items including:
the respective first plurality of consumer contact truncated data item field associated with data items, and the respective encrypted unique consumer identifiers associated with consumers associated with each of the first plurality of consumer contact data items,
wherein the second portion of each of the respective truncated data item fields is not transmitted when fulfilling the first request;
receive a second request from the requestor identifying a subset of the plurality of consumers by their respective encrypted unique consumer identifiers and requesting full consumer contact data associated with the subset of the plurality of consumers, wherein the subset of the plurality of consumers include consumers for whom updated consumer contact data is needed by the requestor based on a comparison of the truncated data item fields associated with the first plurality of consumer contact data items with consumer contact data already in possession of the requestor; and
fulfill the second request by:
determining the unique consumer identifiers associated with respective ones of the subset of the plurality of consumers based on the respective encrypted unique consumer identifiers identified by the second request;
accessing, from the first physical data store and based on the unique consumer identifiers, a second plurality of consumer contact data items, wherein each of the second plurality of consumer contact data items is associated with at least a respective one of the subset of the plurality of consumers;
further accessing, from the first physical data store, data item fields associated with each of the respective second plurality of consumer contact data items, wherein each of the data item fields is associated with a respective source; and
transmitting, to the requestor, the second plurality of consumer contact data items including:
the respective data item fields, wherein the respective data item fields are untruncated,
the respective encrypted unique consumer identifiers associated with consumers associated with each of the second plurality of consumer contact data items,
indications of the respective sources associated with the data item fields, and
indications of respective last update dates associated with the data item fields.

15. The computer-readable, non-transitory storage medium of claim 14, wherein the first portion of each of the respective data item fields includes at least one of: one or more digits of a telephone number; one or more letters, numbers, or symbols of an email address; or one or more letters, numbers, or symbols of a physical address.

16. The computer-readable, non-transitory storage medium of claim 14, the data request fulfillment module operative to further configured fulfill the first request by:
accessing, from a second physical data store, a consumer credit data item associated with at least one of the plurality of consumers; and
transmitting, to the requestor, the consumer credit data item.

* * * * *

UNITED STATES PATENT AND TRADEMARK OFFICE
CERTIFICATE OF CORRECTION

PATENT NO. : 9,697,263 B1
APPLICATION NO. : 13/784063
DATED : July 4, 2017
INVENTOR(S) : Rollin M. Girulat, Jr.

Page 1 of 1

It is certified that error appears in the above-identified patent and that said Letters Patent is hereby corrected as shown below:

In Column 16 at Line 9 (approx.), In Claim 1, change "consumers:" to --consumers;--.

In Column 18 at Line 28 (approx.), In Claim 9, change "consumers:" to --consumers;--.

In Column 19 at Line 63, In Claim 9, after "associated with" insert --each of the--.

Signed and Sealed this
Thirty-first Day of October, 2017

Joseph Matal
*Performing the Functions and Duties of the
Under Secretary of Commerce for Intellectual Property and
Director of the United States Patent and Trademark Office*